US008278547B2

(12) United States Patent
Conger

(10) Patent No.: US 8,278,547 B2
(45) Date of Patent: Oct. 2, 2012

(54) SOLAR ARRAY SUPPORT METHODS AND SYSTEMS

(75) Inventor: Steven J. Conger, Carbondale, CO (US)

(73) Assignee: P4P Holdings LLC, Carbondale, CO (US)

(*) Notice: Subject to any disclaimer, the term of this patent is extended or adjusted under 35 U.S.C. 154(b) by 646 days.

(21) Appl. No.: 12/143,624

(22) Filed: Jun. 20, 2008

(65) Prior Publication Data

US 2008/0283113 A1 Nov. 20, 2008

Related U.S. Application Data

(63) Continuation-in-part of application No. 12/122,228, filed on May 16, 2008, which is a continuation-in-part of application No. 11/856,521, filed on Sep. 17, 2007, now Pat. No. 7,687,706, which is a continuation of application No. 10/606,204, filed on Jun. 25, 2003, now Pat. No. 7,285,719.

(60) Provisional application No. 60/459,711, filed on Apr. 2, 2003.

(51) Int. Cl.
*H01L 31/042* (2006.01)
(52) U.S. Cl. ........................................... 136/244
(58) Field of Classification Search .................. 136/245, 136/244
See application file for complete search history.

(56) References Cited

U.S. PATENT DOCUMENTS

| | | | |
|---|---|---|---|
| 3,449,874 A | 6/1969 | Beaupré | |
| 3,704,560 A | 12/1972 | Ratliff, Jr. | |
| 3,750,349 A | 8/1973 | Deike | |
| 4,025,786 A | 5/1977 | Hamilton | |
| 4,063,963 A | 12/1977 | Bond, Jr. | |
| 4,071,017 A | 1/1978 | Russell, Jr. et al. | |
| 4,119,863 A | 10/1978 | Kelly | |
| 4,122,675 A | 10/1978 | Polyak | |
| 4,186,720 A | 2/1980 | Schmauder et al. | |
| 4,216,762 A | 8/1980 | Klaila | |
| 4,245,616 A | 1/1981 | Wyland | |
| 4,245,895 A | 1/1981 | Wildenrotter | |
| 4,269,173 A | 5/1981 | Krueger et al. | |
| D260,679 S | 9/1981 | Mayerovitch | |
| 4,380,996 A | 4/1983 | Mengeringhausen | |
| 4,386,600 A | 6/1983 | Eggert, Jr. | |
| 4,415,759 A | 11/1983 | Copeland et al. | |

(Continued)

FOREIGN PATENT DOCUMENTS

CA 2004980 A * 6/1990

(Continued)

OTHER PUBLICATIONS

U.S. Appl. No. 12/817,063, filed Jun. 16, 2010, Conger.

(Continued)

*Primary Examiner* — Jonathan Johnson
*Assistant Examiner* — Miriam Berdichevsky
(74) *Attorney, Agent, or Firm* — Sheridan Ross P.C.

(57) ABSTRACT

Systems and methods for disposing and supporting a solar panel array are disclosed. In one embodiment, a system for supporting a solar panel array includes the use of support columns and cables suspended between the support columns, with the solar panels received by solar panel receivers that are adapted to couple to the cables. The solar panel array may then be used to provide power as well as shelter. Cooling, lighting, security, or other devices may be added to the solar panel array.

20 Claims, 37 Drawing Sheets

U.S. PATENT DOCUMENTS

| | | | |
|---|---|---|---|
| 4,429,178 A | 1/1984 | Prideaux et al. | |
| 4,449,347 A | 5/1984 | Rooney | |
| 4,457,035 A | 7/1984 | Habegger et al. | |
| 4,487,989 A | 12/1984 | Wakefield et al. | |
| 4,574,535 A | 3/1986 | Pabsch | |
| 4,587,951 A | 5/1986 | Townsend et al. | |
| 4,602,613 A | 7/1986 | Barr | |
| D285,829 S | 9/1986 | Lock | |
| 4,656,996 A | 4/1987 | Aharaon | |
| 4,832,001 A | 5/1989 | Baer | |
| 4,835,918 A | 6/1989 | Dippel | |
| D303,244 S | 9/1989 | Hanak | |
| D311,722 S | 10/1990 | Cheng | |
| 5,058,565 A | 10/1991 | Gee et al. | |
| 5,069,540 A | 12/1991 | Gonder | |
| 5,125,608 A | 6/1992 | McMaster et al. | |
| 5,176,758 A | 1/1993 | Nath et al. | |
| 5,212,916 A | 5/1993 | Dippel et al. | |
| 5,236,378 A | 8/1993 | Newman | |
| 5,347,402 A | 9/1994 | Arbogast | |
| D353,129 S | 12/1994 | Ricaud et al. | |
| 5,478,407 A | 12/1995 | Dorison et al. | |
| 5,524,401 A | 6/1996 | Ishikawa et al. | |
| D380,191 S | 6/1997 | White | |
| 5,769,068 A * | 6/1998 | Takahashi | 126/569 |
| D408,554 S | 4/1999 | Dinwoodie | |
| 5,937,849 A | 8/1999 | Myles, III et al. | |
| 5,961,099 A | 10/1999 | Thommen, Jr. | |
| D425,013 S | 5/2000 | Lai | |
| 6,091,016 A | 7/2000 | Kester | |
| 6,105,316 A | 8/2000 | Bottger et al. | |
| D442,139 S | 5/2001 | Sasaoka | |
| RE37,498 E | 1/2002 | Thomas | |
| 6,397,869 B1 | 6/2002 | Jennings | |
| 6,443,145 B1 | 9/2002 | Buron et al. | |
| D469,399 S | 1/2003 | Shugar | |
| 6,563,040 B2 | 5/2003 | Hayden et al. | |
| D475,320 S | 6/2003 | Hensley et al. | |
| 6,930,237 B2 | 8/2005 | Mattiuzzo | |
| D511,576 S | 11/2005 | Shingleton et al. | |
| 7,285,719 B2 | 10/2007 | Conger | |
| D560,605 S | 1/2008 | McClintock et al. | |
| D560,606 S | 1/2008 | McClintock et al. | |
| 2005/0109384 A1 | 5/2005 | Shingleton et al. | |
| 2005/0141153 A1 | 6/2005 | Mucci et al. | |
| 2006/0124168 A1 | 6/2006 | Momii et al. | |
| 2008/0047546 A1 | 2/2008 | Cummings | |
| 2008/0057776 A1 | 3/2008 | Cummings | |
| 2008/0061193 A1 | 3/2008 | Conger | |
| 2008/0066801 A1 | 3/2008 | Schwarze | |
| 2008/0135095 A1 | 6/2008 | Cummings et al. | |
| 2008/0168981 A1 | 7/2008 | Cummings et al. | |
| 2009/0038672 A1 | 2/2009 | Conger | |
| 2009/0184223 A1 | 7/2009 | Schwarze et al. | |
| 2009/0200808 A1 | 8/2009 | Parmley | |
| 2009/0211625 A1 | 8/2009 | Schwarze | |
| 2009/0244890 A1 | 10/2009 | Pelken et al. | |
| 2010/0038507 A1 | 2/2010 | Schwarze et al. | |
| 2010/0051083 A1 | 3/2010 | Boyk | |
| 2010/0095609 A1 | 4/2010 | Kim | |
| 2010/0183443 A1 | 7/2010 | Thorne | |
| 2010/0212654 A1 | 8/2010 | Alejo Trevijano | |
| 2010/0251618 A1 | 10/2010 | Nishikawa et al. | |
| 2011/0089698 A1 | 4/2011 | Ahmadi | |
| 2011/0113705 A1 | 5/2011 | Raczkowski | |
| 2011/0221203 A1 | 9/2011 | Miller | |
| 2011/0277809 A1 | 11/2011 | Dalland et al. | |

FOREIGN PATENT DOCUMENTS

| | | |
|---|---|---|
| CA | 2397850 | 2/2004 |
| DE | 3504133 | 8/1986 |
| DE | 3643487 | 6/1988 |
| DE | 4038646 | 6/1992 |
| DE | 10050021 | 4/2001 |
| DE | 10116783 | 10/2002 |
| EP | 0373234 | 6/1990 |
| JP | 10-266499 | 10/1998 |
| JP | 2004-71805 | 9/2005 |
| WO | WO 2005/085633 | 9/2005 |
| WO | WO 2008/141813 | 11/2008 |
| WO | WO 2009/065377 | 5/2009 |

OTHER PUBLICATIONS

U.S. Appl. No. 29/345,216, filed Oct. 12, 2009, Conger et al.
U.S. Appl. No. 12/580,170, filed Oct. 15, 2009, Conger et al.
U.S. Appl. No. 12/700,277, filed Feb. 4, 2010, Conger et al.
U.S. Appl. No. 29/376,719, filed Oct. 11, 2010, Conger.
Definition of "column," http://www.thefreedictionary.com/p/column, printed Dec. 14, 2010, 4 pages.
Difference between shear connection and moment connections, http://wiki.answers.com/Q/Difference_between_shear_connection_and_moment_connections, printed Dec. 14, 2010, 1 page.
Definition of "moment connection," http://mbmisteelbuildings.com/metal-building-terms#m, printed Dec. 19, 2010, 1 page.
Definition of "moment," http://www.thefreedictionary.com/p/moment, printed Dec. 19, 2010, 4 pages.
International Preliminary Report on Patentability for International (PCT) Patent Application No. PCT/US2008/071414, mailed Nov. 25, 2010.
International Preliminary Report on Patentability for International (PCT) Patent Application No. PCT/US2009/044060, mailed Nov. 25, 2010.
U.S. Appl. No. 12/466,331, filed May 14, 2009, Conger.
International Search Report for International (PCT) Patent Application No. PCT/US09/44060, mailed Jun. 24, 2009.
Written Opinion for International (PCT) Patent Application No. PCT/US09/44060, mailed Jun. 24, 2009.
U.S. Appl. No. 12/122,228, filed May 16, 2008, Conger.
U.S. Appl. No. 29/318,238, filed May 15, 2008, Conger.
U.S. Appl. No. 29/319,853, filed Jun. 16, 2008, Conger.
"coolearth technology" coolearth, available at http://www.coolearthsolar.com/technology, date unknown, p. 1-2.
"Sharp Provides Solar Panels for Winery's "Floatovoltaic" Solar Array", available at http://solarbuss.com/News/NewsNAPR1099.htm, dated May 29, 2008 (accessed Jun. 23, 2008), pp. 1-2.
Foster + Partners "Hearst Headquarters", available at http://www.fosterandpartners.com/Projects/1124/Default.aspx, printerd Aug. 5, 2008, 11 pages.
Examination Report for European Patent Application No. 04759693.7-1528, dated Apr. 27, 2007.
International Search Report for International (PCT) Patent Application No. PCT/US2004/008509, dated Oct. 22, 2004.
Written Opinion for International (PCT) Patent Application No. PCT/US2004/008509, dated Oct. 21, 2004.
International Preliminary Report on Patentability for International (PCT) Patent Application No. PCT/US2004/008509, dated Oct. 14, 2005.
Baumgartner et al. "Solar Wings A New Lightweight PV Tracking System", 23re Eu PVSEC, Valencia, Sep. 4, 2008, invited talk 4DO.9.5.
Solyndra web pages available at http://ww.solyndra.com, printed May 11, 2009, 7 pages.
"Single Axis Sun Power T20 Trackers", date unknown, 5 pages.
U.S. Appl. No. 29/357,531, filed Mar. 12, 2010, Conger.
Solon Hilber—Malaga/Spain, available at http://www.solonhilber.at, translated by Google translate, available at least as early as Sep. 21, 2007, printed Mar. 23, 2010, 7 pages.
First Report for Australian Patent Application No. 2004231646, dated Jul. 23, 2008.
International Search Report for International (PCT) Patent Application No. PCT/US08/71414, dated Sep. 26, 2008.
Written Opinion for International (PCT) Patent Application No. PCT/US08/71414, dated Sep. 26, 2008.
U.S. Appl. No. 29/400,363, filed Aug. 26, 2011, Conger.
U.S. Appl. No. 29/394,051, filed Jun. 13, 2011, Conger.
U.S. Appl. No. 29/394,727, filed Jun. 21, 2011, Conger.
Official Action for Australia Patent Application No. 2009246194, dated Aug. 22, 2011, 2 pages.

* cited by examiner

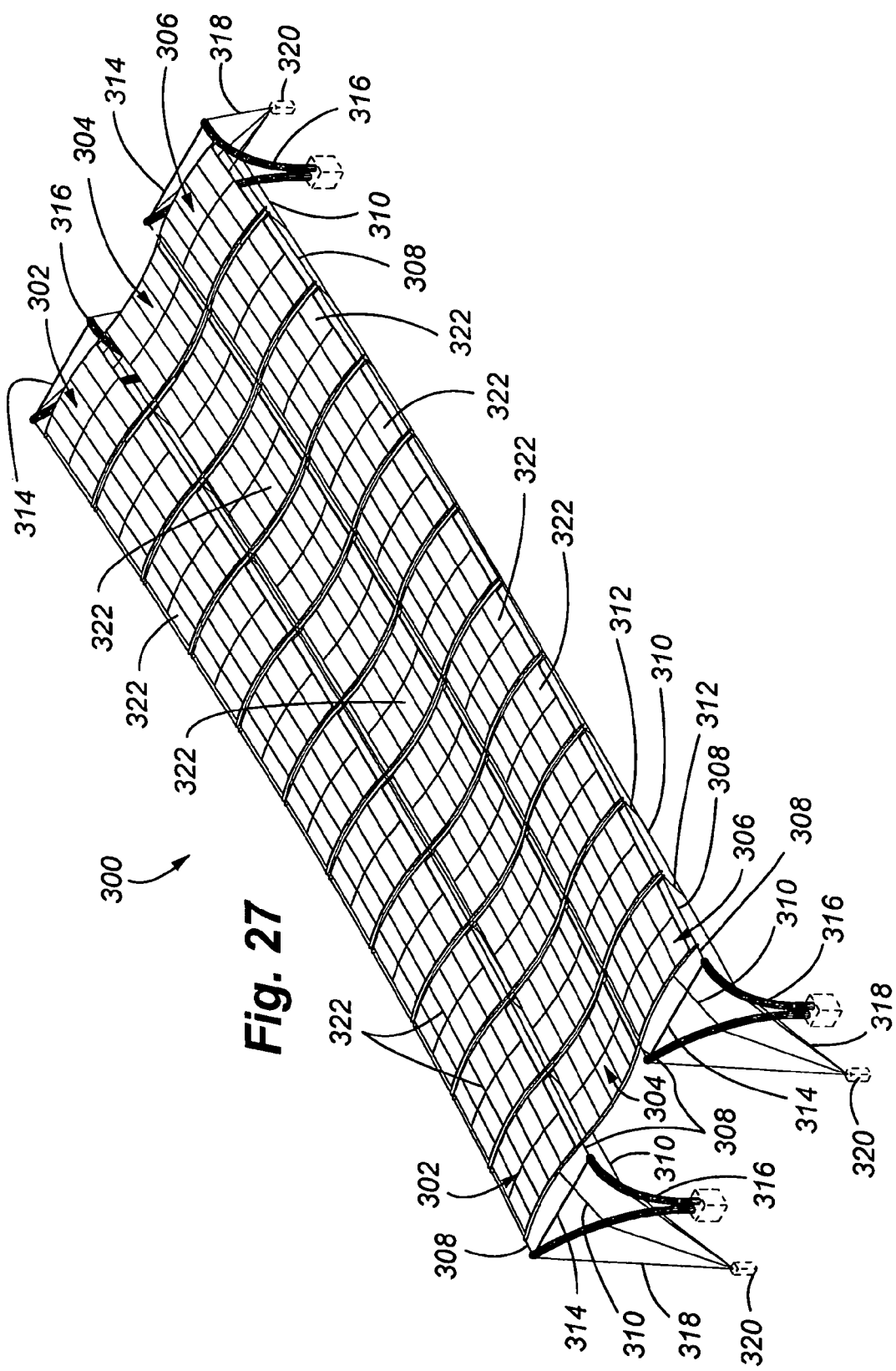

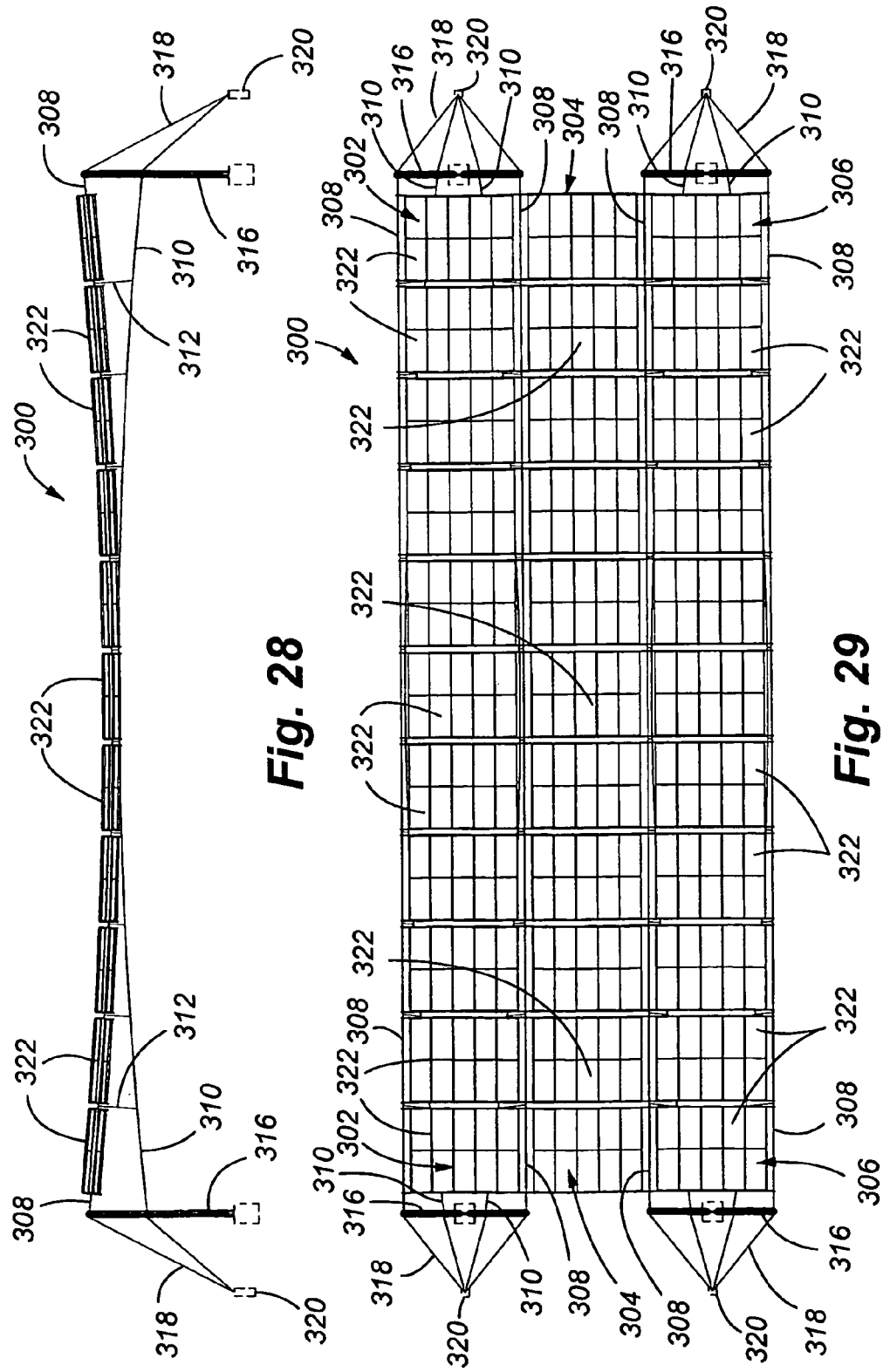

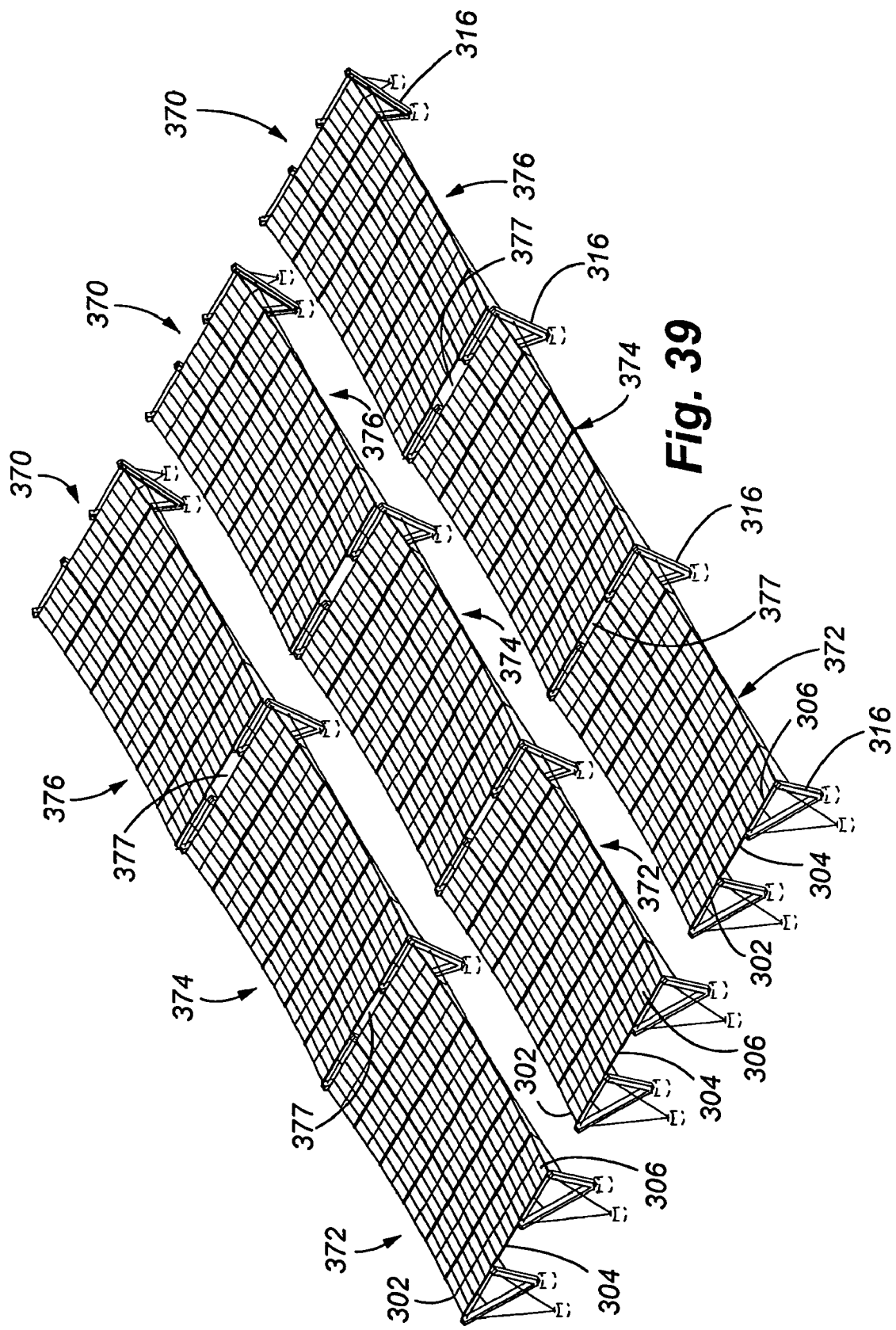

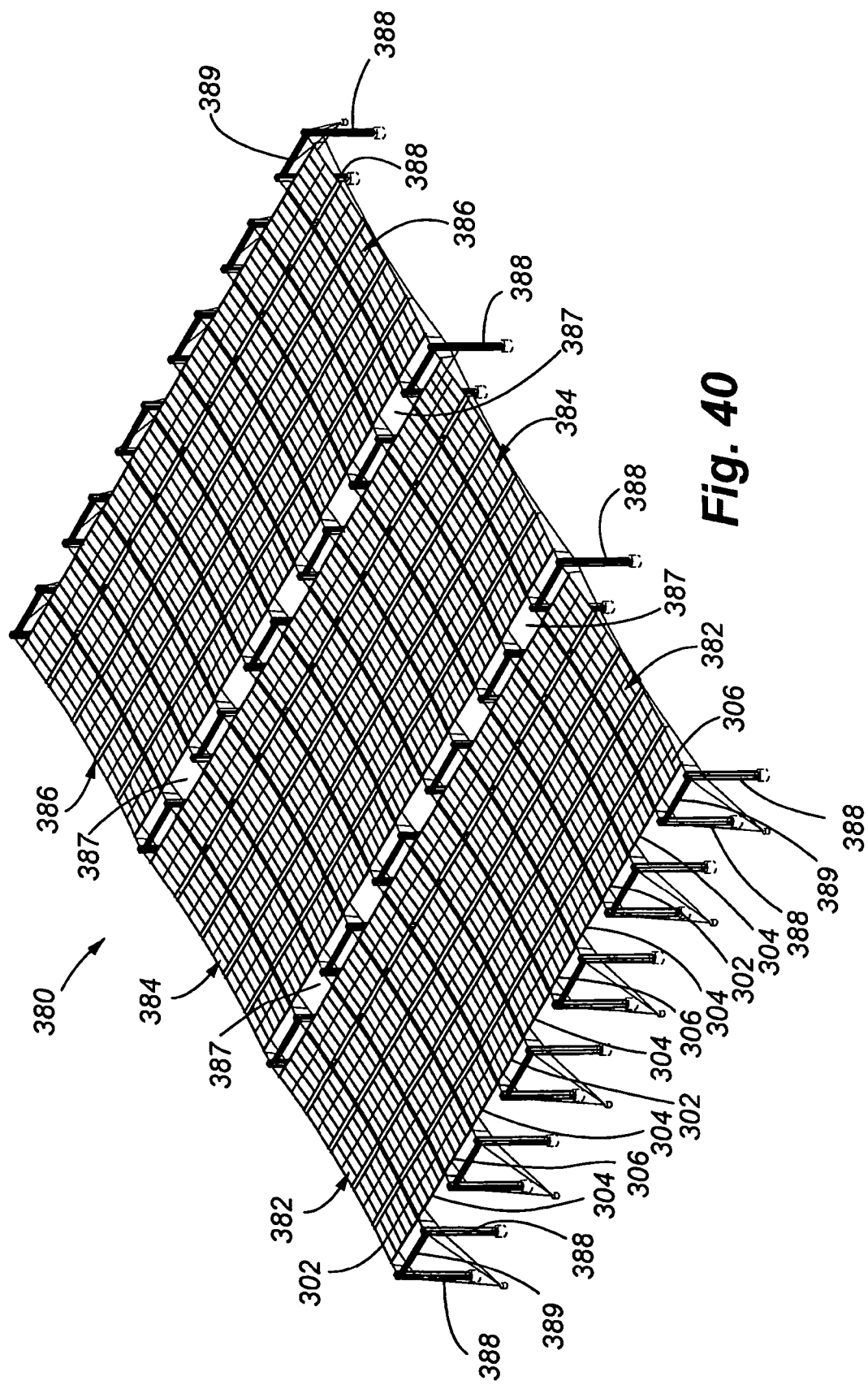

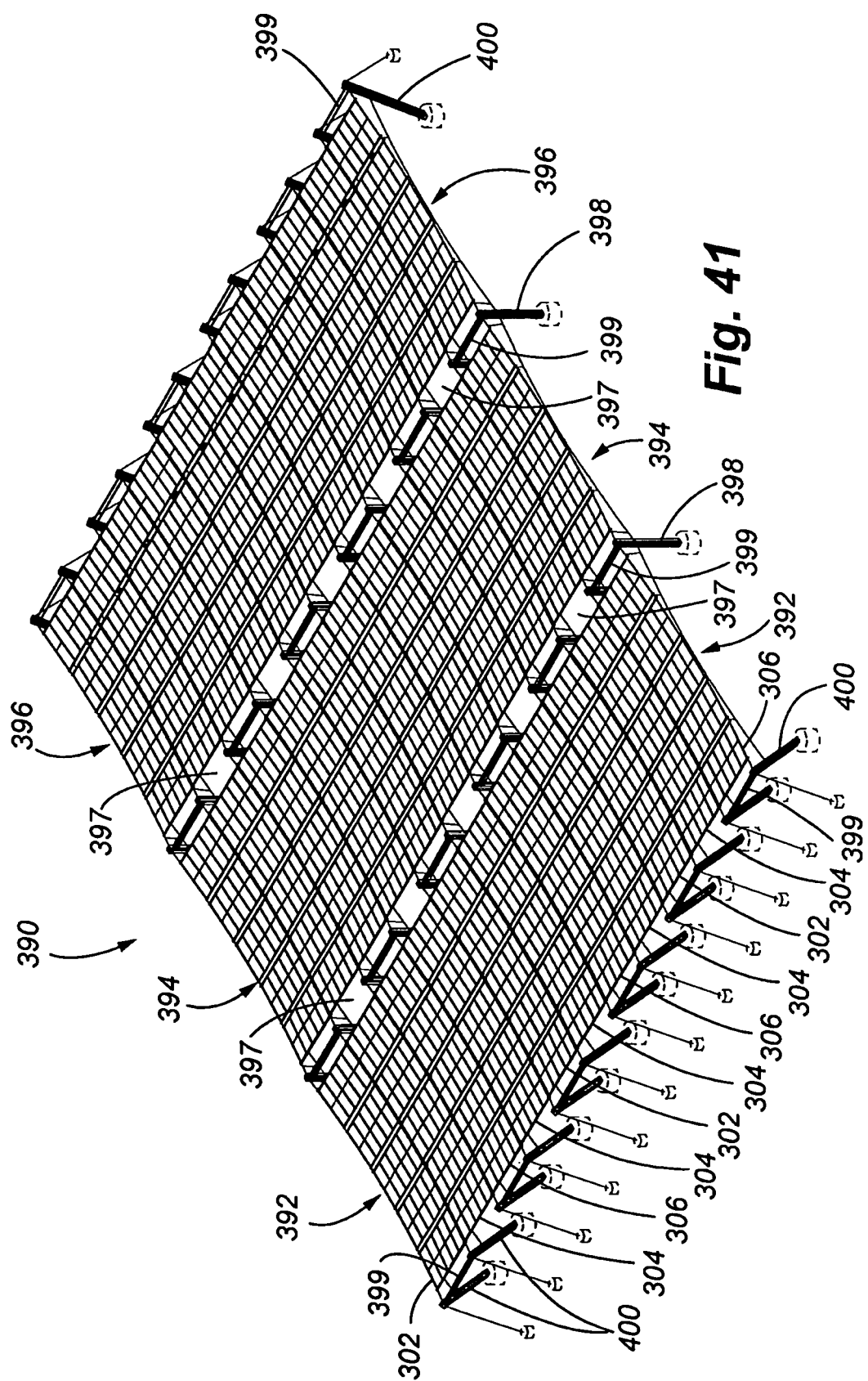

SOLAR ARRAY SUPPORT METHODS AND SYSTEMS

CROSS REFERENCE TO RELATED APPLICATIONS

This application is a continuation-in-part application of U.S. application Ser. No. 12/122,228, filed on May 16, 2008, entitled "Solar Array Support Methods and Systems", which is a continuation-in-part of U.S. application Ser. No. 11/856,521, filed on Sep. 17, 2007, entitled "Solar Array Support Methods and Systems", which is a continuation application of U.S. application Ser. No. 10/606,204, filed Jun. 25, 2003, now the U.S. Pat. No. 7,285,719, entitled "Solar Array Support Methods and Systems", which claims priority from Provisional Application Ser. No. 60/459,711, filed Apr. 2, 2003, entitled "SOLAR SCULPTURE ENERGY AND UTILITY ARRAY", each prior application being incorporated herein by reference.

FIELD OF THE INVENTION

The present invention is related to the field of solar energy capture, and more particularly, to devices, systems and methods relating solar energy capture.

BACKGROUND OF THE INVENTION

Present systems for supporting solar panels tend to be bulky and expensive. Given the size and weight of such systems, implementation of solar panel arrays in remote locations is difficult and expensive. When large equipment is required, installation of a solar panel array in an environmentally sensitive area without significant impact on surrounding habitat becomes very difficult. Typically, such support systems do not allow for secondary uses of the solar panel arrays.

SUMMARY OF THE INVENTION

The present invention, in an illustrative embodiment, includes a system for supporting a solar panel array. The system includes two pairs of vertical columns, where each pair includes a tall column and a short column. The pairs are placed a distance apart, and a first support cable is secured between the short columns and a second support cable is secured between the tall columns. A guy wire or other anchoring devices may be attached to the columns to provide lateral support to the columns against the tension created by suspending the support cables between the spaced columns. The system further includes a solar panel receiver adapted to be secured to the two support cables. The solar panel receiver may be adapted to receive any type of solar panel or several panels. The receiver may include a maintenance catwalk or other access providing design element.

In another illustrative embodiment, the present invention includes a system for providing both shelter and electricity. The system may again include columns, support cables, and one or more solar panel receivers as in the illustrative solar panel array support system noted above. The system further includes a number of solar panels secured to or received by the solar panel receiver. The columns may be sized to allow an activity to occur beneath the solar panel receivers. For example, if the desired activity is that of providing a shaded parking lot, the columns may have a height allowing vehicles to be parked beneath the solar panel receivers, and the columns may be spaced apart to create a sheltered area sized to correspond to the desired area of the parking lot. In yet another illustrative embodiment, the present invention includes a system for supporting a solar panel array, the system comprising four anchor points, with a first support cable suspended between a first pair of anchor points, and a second support cable suspended between a second pair of anchor points. The system further includes a solar panel receiver adapted to be supported by the first and second support cables, the solar panel receiver also adapted to receive one or more solar panels.

In a further embodiment, the present invention includes methods of supporting a solar panel array. The methods include the step of using cables to support solar panel receivers adapted to receive one or more solar panels. In yet another embodiment, the present invention includes a method of creating a sheltered space that makes use of a solar panel array that creates electricity, where the method also includes using the electricity to cool an area beneath the array. For example, the electricity produced from the array can be used to power a water pump that delivers water to a water-misting device secured to the array. A network of water lines and misting-nozzles can be distributed throughout the array to provide cooling under the array which when coupled with the shade produced by the overhead array can be used to effectively cool the area under the array.

In further embodiments, various combinations of curved shaped and planar shaped panel receivers are used in solar arrays sized to meet specific installation requirements.

In other embodiments, the present invention includes systems comprising various combinations of support cables, anchor lines, anchors, and support columns.

BRIEF DESCRIPTION OF THE DRAWINGS

FIG. 27 is a perspective view of another embodiment of the present invention showing three rows of panel receivers/pods with both convex and concave curvatures when viewed from above;

FIG. 28 is an elevation view of the embodiment of FIG. 27;

FIG. 29 is an overhead plan view of the embodiment of FIG. 27;

FIG. 32A is a greatly enlarged section of FIG. 32 illustrating the intersection of four panel receivers/pods and showing the gaps between each pod and the cable arrangement providing support;

FIG. 39 is a perspective view of another embodiment of the present invention showing three groups of three row pod configurations spaced from one another;

FIG. 40 is a perspective view of yet another embodiment of the present invention showing a plurality of three row configurations joined to form an array with three primary spans and incorporating different columns; and FIG. 41 is a perspective view of yet another embodiment of the present invention showing a plurality of three row configurations joined to form an array with three primary spans similar to the embodiment in FIG. 41, but incorporating exterior columns extending at an angle.

DETAILED DESCRIPTION

The following detailed description should be read with reference to the drawings. The drawings, which are not necessarily to scale, depict illustrative embodiments and are not intended to limit the scope of the invention.

Figure 1:
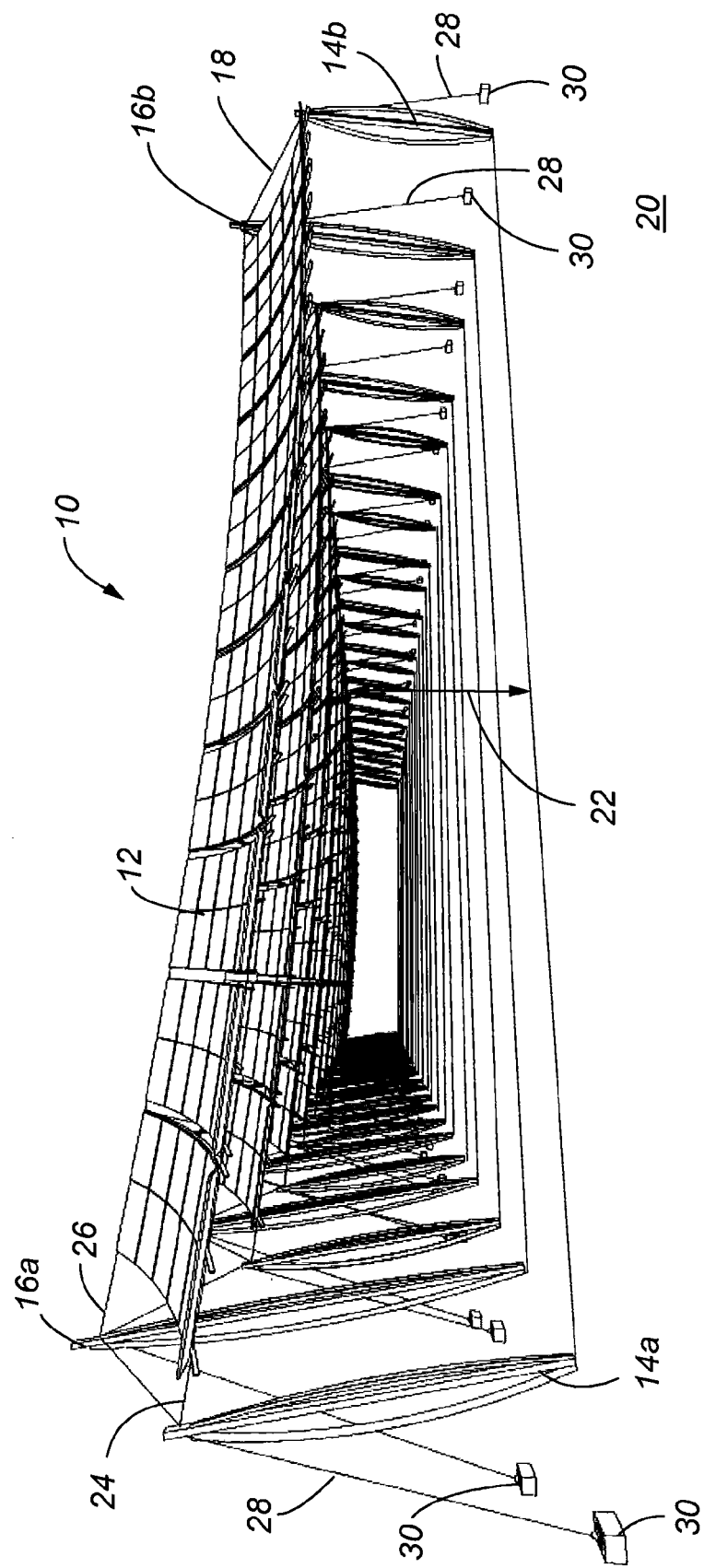
FIG. 1 is a perspective view of a solar panel array supported in accordance to an illustrative embodiment.

FIG. 1 is a perspective view of a solar panel array supported in accordance with an illustrative embodiment. A solar panel array 10 is illustrated as including a number of solar panel receivers 12. Pairs of short columns 14a, 14b and tall columns 16a, 16b are aligned with one another. The pairs of columns 14a, 16a and 14b, 16b may also be connected by a stability cable 18 that runs along the edges of the array 10. The solar panel receivers 12 are held above a surface 20 at a height 22 defined by the columns 14a, 14b, 16a, 16b. A first cable 24 is suspended between the short columns 14a, 14b, and a second cable 26 is suspended between the tall columns 16a, 16b. The solar panel receivers 12 are designed to be supported by the cables 24, 26, so that the overall design is a lightweight, flexible and strong solar panel array 10 that leaves plenty of usable, sheltered space below. Anchor lines 28 and anchors 30 may be used to provide further support and to enable the use of lightweight columns 14a, 14b, 16a, 16b. Anchor lines 28 may be cables, or may be steel rods.

The surface 20 may be, for example, a generally flat area of ground, a picnic area in a park, a parking lot, or a playground. The height 22 may be chosen to allow for a desired activity to occur beneath the array 10. For example, if a parking lot is beneath the array 10, the height 22 may be sufficient to allow typical cars and light trucks to be parked underneath the array 10, or the height may be higher to allow commercial trucks to be parked beneath the array 10. If a playground is beneath the array 10, the array 10 may have a height 22 chosen to allow installation of desired playground equipment.

Any suitable material and/or structure may be used for the columns 14a, 14b, 16a, 16b including, for example, concrete or metal, or a simple pole or a more complicated trussed column. In some embodiments a footing may be placed beneath the base of each of the columns 14a, 14b, 16a, 16b to provide stability on relatively soft ground. The cables 18, 24, 26 and anchor lines 28 may be made of any material and design as well including, for example, metals, composites, and/or polymeric fibers. In one embodiment the primary material used in the columns 14a, 14b, 16a, 16b, the cables 24, 26 and the anchor lines 28 is steel. Because the primary support technology for the array 10 is the cables 24, 26 under tension, the design is both visually and literally lightweight.

While FIG. 1 illustrates an embodiment wherein the columns 14a, 14b, 16a, 16b are either "short" or "tall", in other embodiments the columns may all be of the same height. No particular angle of elevation is required by the present invention, however, it is contemplated that, depending upon the latitude, time of year, and perhaps other factors, certain angles may be more effective in capturing incident sunlight.

Figure 2:
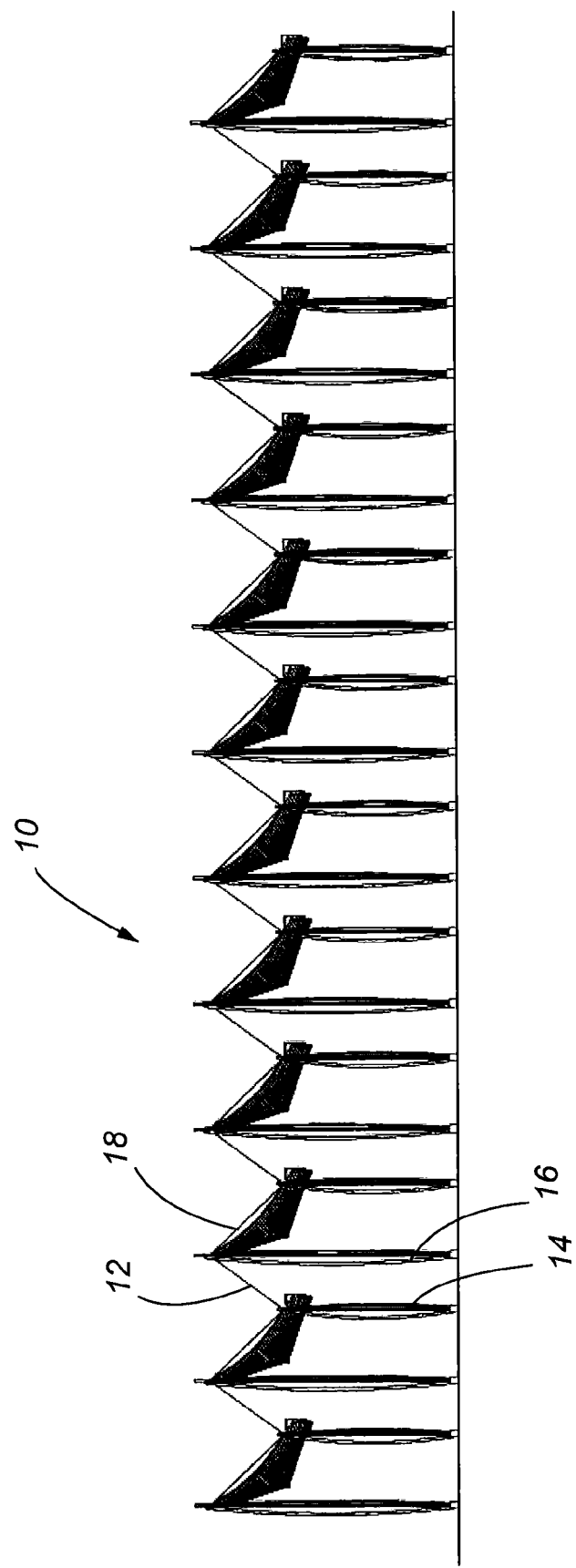
FIG. 2 is a longitudinal section view of a solar panel array supported in accordance to an illustrative embodiment.

FIG. 2 is a longitudinal section view of a solar panel array supported in accordance with an illustrative embodiment. The array 10 illustrates the relative spacing of rows of the array 10, and helps to show how the stability cable 18 connects the columns 14, 16 of the array 10. The stability cable 18 may be coupled to an anchor member as well, though this is not shown in FIG. 2. It can be seen that the relative heights of the columns 14, 16 help to define the angle that the solar panel receivers 12 have with respect to the incident sunlight. In some embodiments, the columns 14, 16 or the solar panel receivers 12 may include a mechanism allowing for adjustment of the angle of the solar panel receivers 12. To do so, for example, the length of the columns 14, 16 may be adjusted, or the solar panel receivers 12 may include a mechanism for changing the angle of individual panels or entire receivers 12. For example, with the changing of seasons, the height of the sun in the sky may vary sufficiently to affect the efficiency of the solar panel receivers 12, and so it may be desirable to vary the angle of the receivers 12. Also, as the sun moves during the day it may be desirable to change the angle of the receivers 12 to improve light reception.

Figure 3:
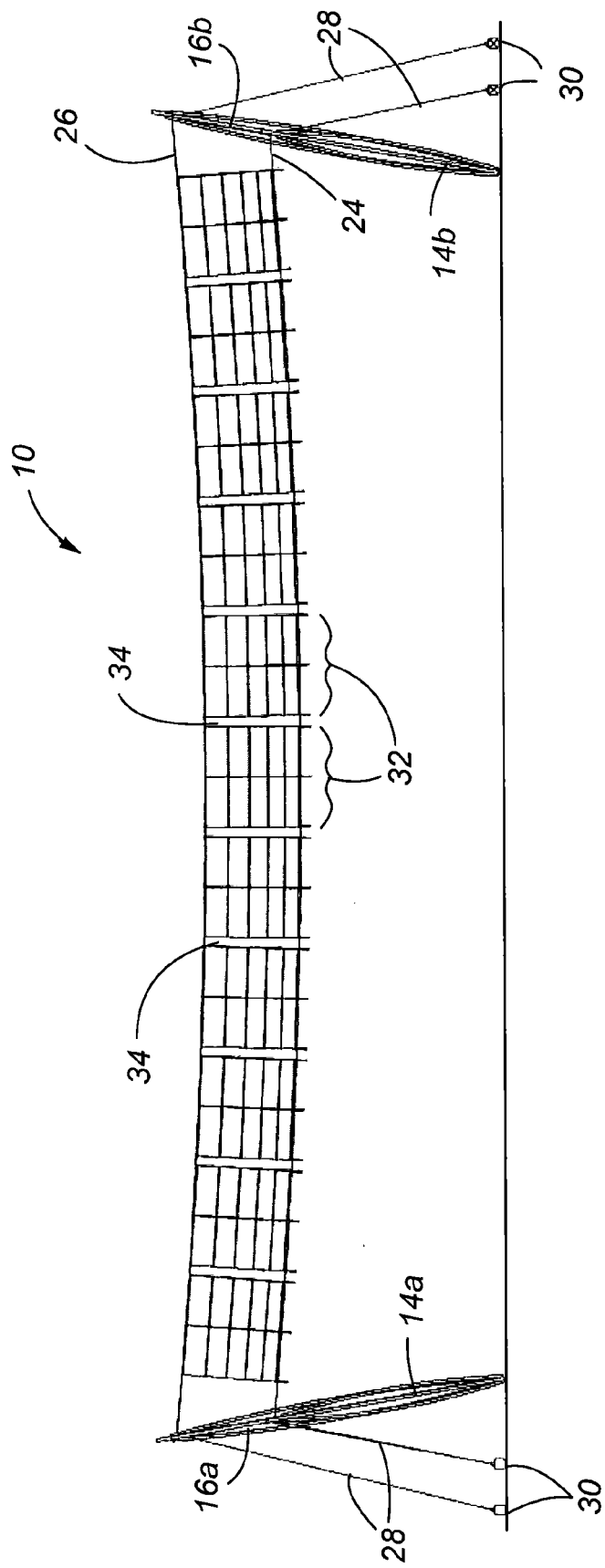
FIG. 3 is a horizontal section view of a solar panel array supported in accordance to an illustrative embodiment.

FIG. 3 is a horizontal section view of a solar panel array supported in accordance with an illustrative embodiment. As illustrated, the array 10 is supported by short columns 14a, 14b, tall columns 16a, 16b, and cables 24, 26. Anchor lines 28 and anchors 30 are provided to improve stability and allow the use of lightweight columns 14a, 14b, 16a, 16b. The solar panel receivers 12 are illustrated as pairs of individual units 32 having gaps 34 between each unit 32. The gaps 34 allow for air movement, reducing the amount of wind resistance of the array 10. The gaps 34 also allow for relative movement of the units 32 since the cables 24, 26 are somewhat flexible.

Figure 4:
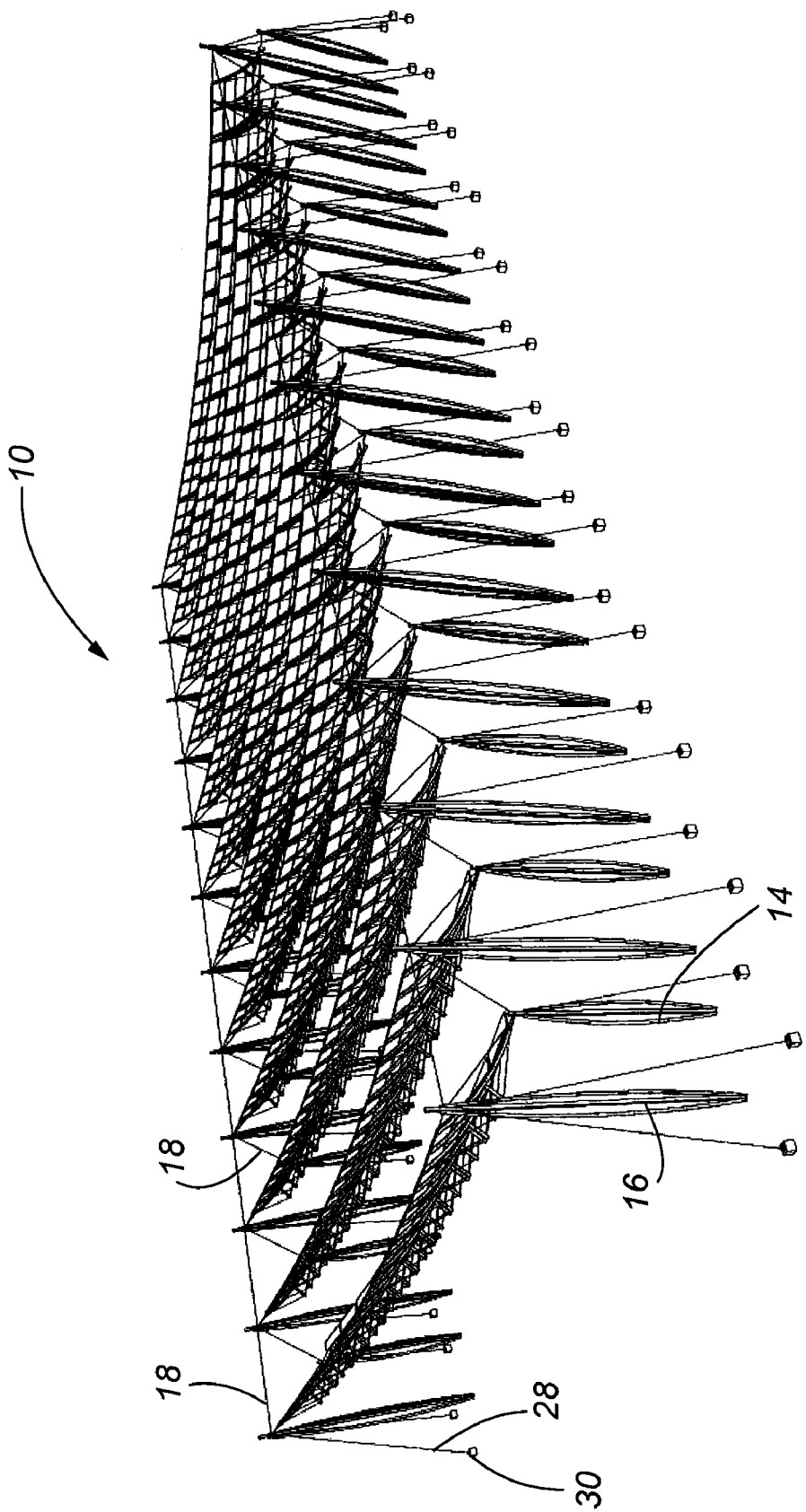
FIG. 4 is a perspective rear view of an illustrative solar panel array.

FIG. 4 is a perspective rear view of an illustrative solar panel array. It can be seen that the stability cables 18 are coupled in various configurations along the length of the array 10, linking the short columns 14 and tall columns 16 to create a linked structure. The array 10 also includes various anchor cables 28 and anchor points 30, including at the end of the array 10 that may help anchor the stability cables 18.

Figure 5:
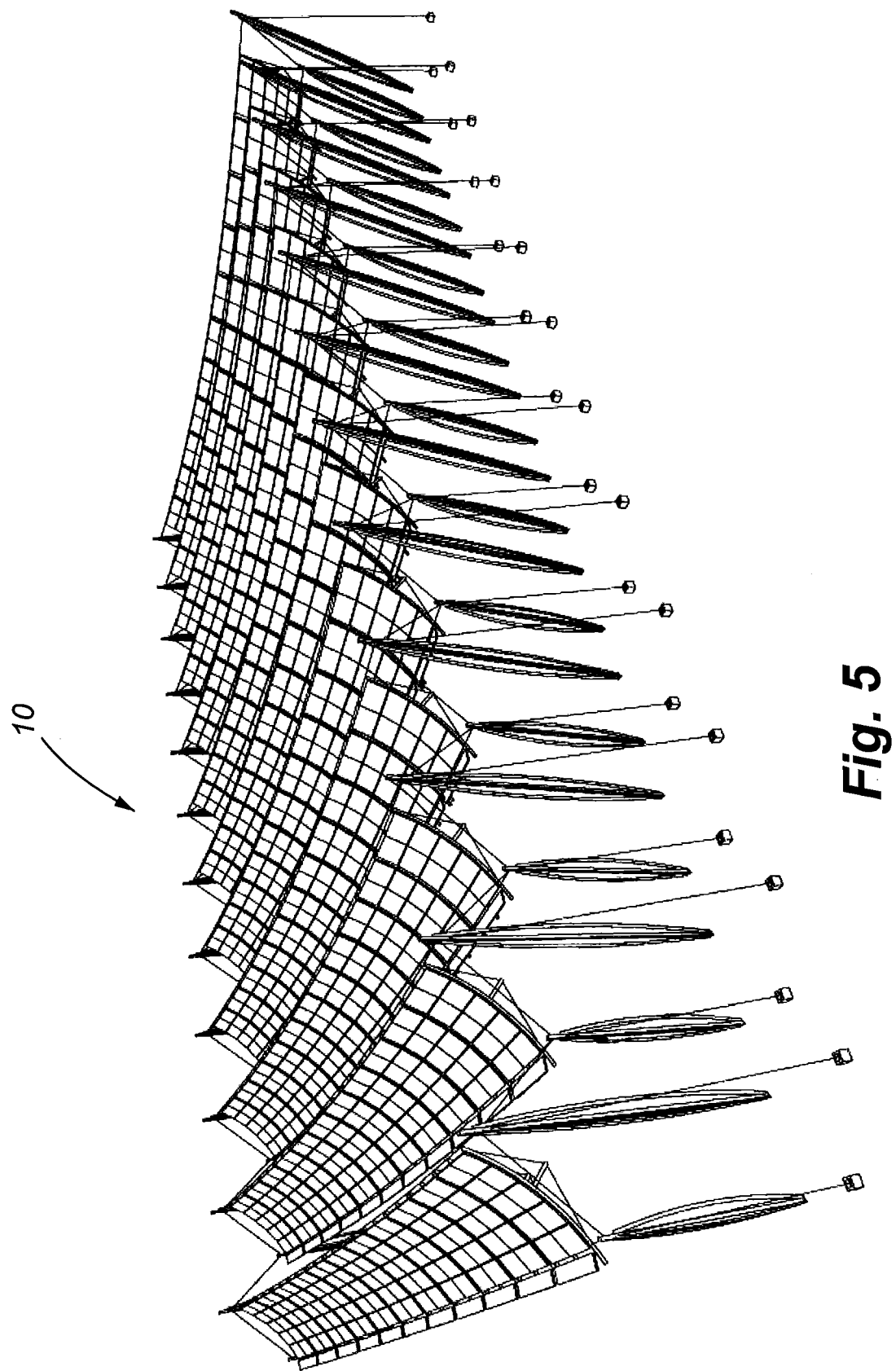
FIG. 5 is a perspective side view of an illustrative solar panel array.

FIG. 5 is a perspective side view of an illustrative solar panel array 10 that is similar to that shown in FIGS. 1-4. It can be appreciated from the several views of FIGS. 1-5 that the illustrative array 10 provides a readily usable shelter that is amenable to a variety of activities.

Figure 6:
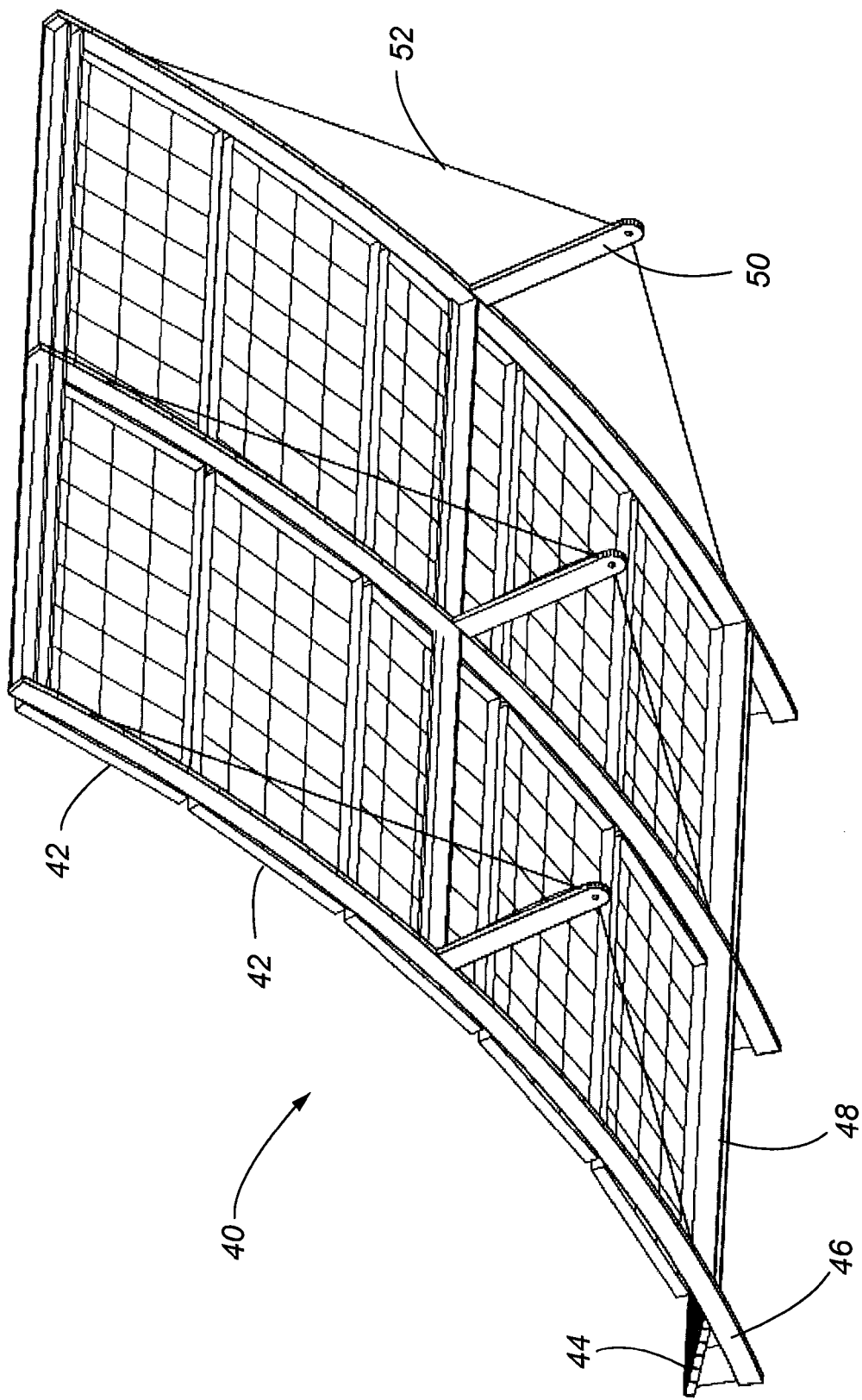
FIG. 6 is a rear perspective view of an illustrative pod showing the use of several struts and cords to create a rigid member.
Figure 7:
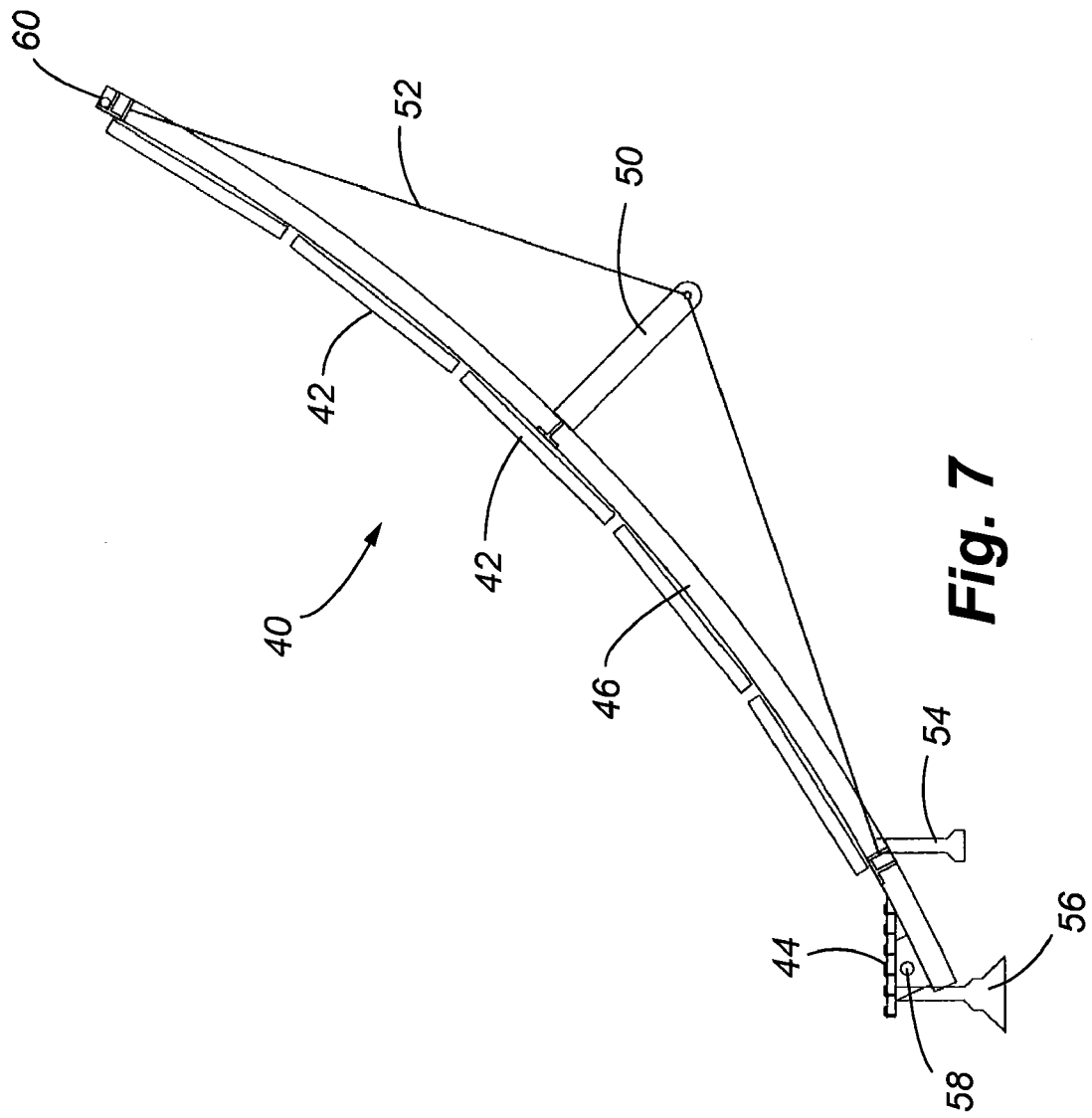
FIG. 7 is a section view of an illustrative pod including several optional features.

FIGS. 6 and 7 illustrate a pod that may be used as a solar panel receiver. The "pods" illustrated herein are intended to provide an example of a solar panel receiver that may be used with the present invention. The solar panel receiver may, of course, have a variety of other structures to perform its function of holding one or more solar panels while being adapted to couple to support cables as illustrated herein.

FIG. 6 is a rear perspective view of an illustrative pod showing the use of several struts and cords to create a rigid member. The pod 40 is shown with several solar panels 42 which may be, for example, photovoltaic panels. A maintenance walkway 44 is included as an optional feature of the pod 40. Several curved struts 46 extend vertically along the back of the pod 40, with several horizontal struts 48 coupled by moment connections to the curved struts 46. By using moment connections, the overall structure becomes a rigid yet lightweight frame for receiving the solar panels 42. A center strut 50 extends out of the back of the pod 40, and is connected to a truss cable 52 which provides another lightweight yet highly supportive aspect of the structure. The center strut 50 and truss cable 52 allow a lightweight curved strut 46 to be used, lending support to the center of the curved strut 46.

In another embodiment, rather than creating electricity with photovoltaic panels, the present invention may also be used to support solar panels that collect solar thermal energy. The solar thermal collectors could be mounted on the solar panel receivers illustrated herein, and thermal energy could be collected by the use of a heat transfer medium pumped through flexible tubing. In one such embodiment, glycol may be used as a mobile heat transfer medium, though any suitable material may be used.

FIG. 7 is a section view of an illustrative pod including several optional features. The pod 40 is shown with solar panels 42 in place. The optional maintenance walkway 44 is again shown on the lower portion of the curved member 46. The center strut 50 and truss cable 52 again provide support to the curved member 46. The pod 40 may include, for example, a mister 54 that can be used to provide evaporative cooling to the sheltered area beneath a solar array using the pod 40. The pod 40 may also include a light 56 or security camera, for example. In one embodiment, a solar array may be used to provide a parking shelter, with the solar array storing electricity during the day using, for example, fuel cells or batteries, and then discharging the stored electricity by lighting the shelter created by the solar array during the evening.

Two cable receivers 58, 60 are also illustrated. While shown in the form of a simple opening that a cable may pass through, the cable receivers 58, 60 may take on a number of other forms. For example, the cable receivers 58, 60 may include a mechanism for releasably locking onto a cable. It can be appreciated from FIGS. 6 and 7 that the illustrative pod 40 is designed so that rain is readily directed off of the solar panels, as the water will run down the curve of the pod 40. In other embodiments, the pod 40 may be more or less flat, rather than having the curvature shown, or may have a different curvature than that shown.

Figure 8:
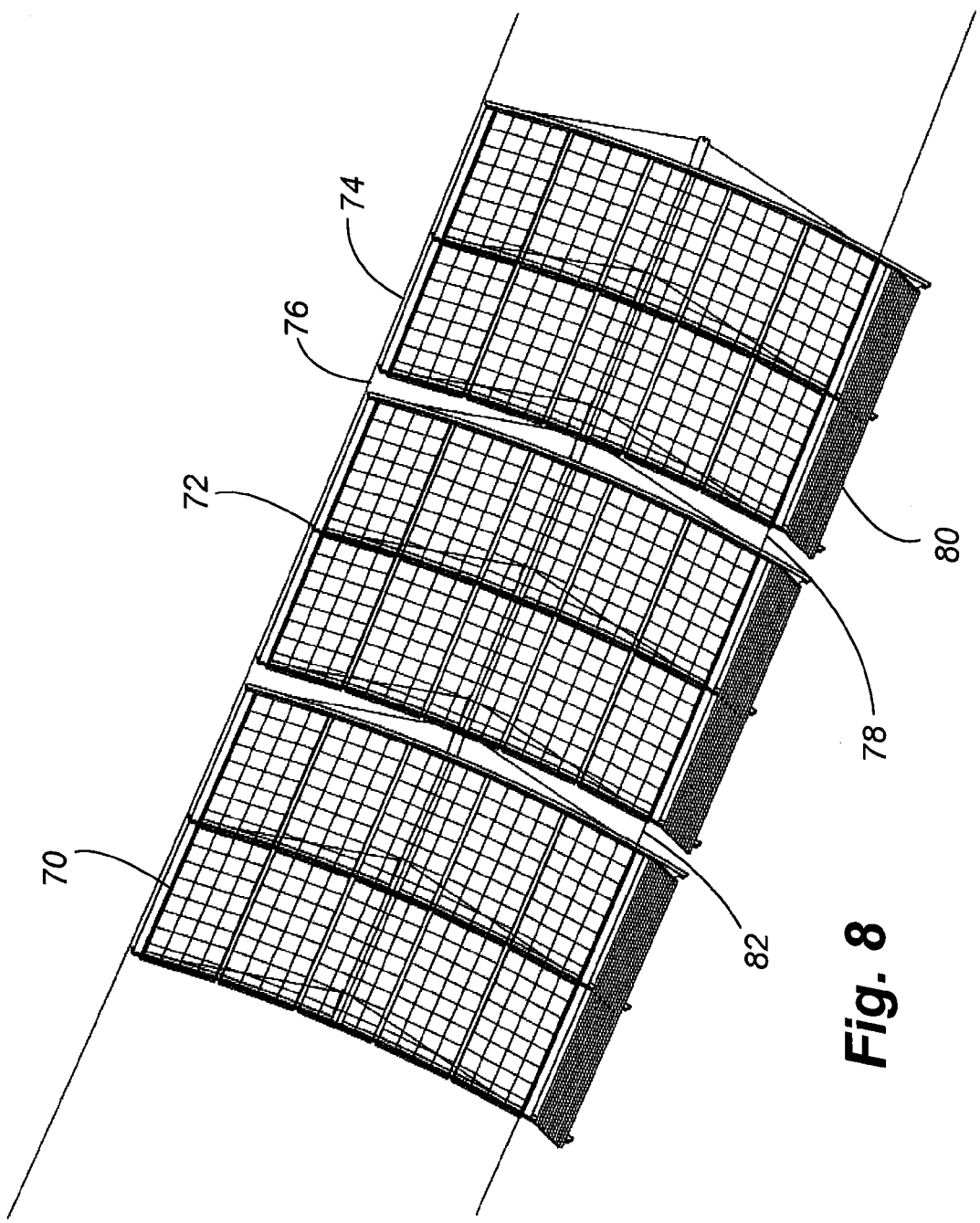
FIG. 8 is a front perspective view of several solar panel receivers linked together.

FIG. 8 is a perspective front view of several solar panel receivers linked together. A first solar panel receiver 70, a second solar panel receiver 72, and a third solar panel receiver 74 are supported by an upper support cable 76 and a lower support cable 78. An optional maintenance walkway 80 is illustrated as well. Also included is a flexible electric cable 82 that allows for transmission of electrical power from each of the solar panel receivers 70, 72, 74 when solar energy is captured. The flexible electric cable 82 may also serve to distribute power to devices such as security cameras or lighting that may be provided beneath the solar panel receivers 70, 72, 74.

Figure 9:
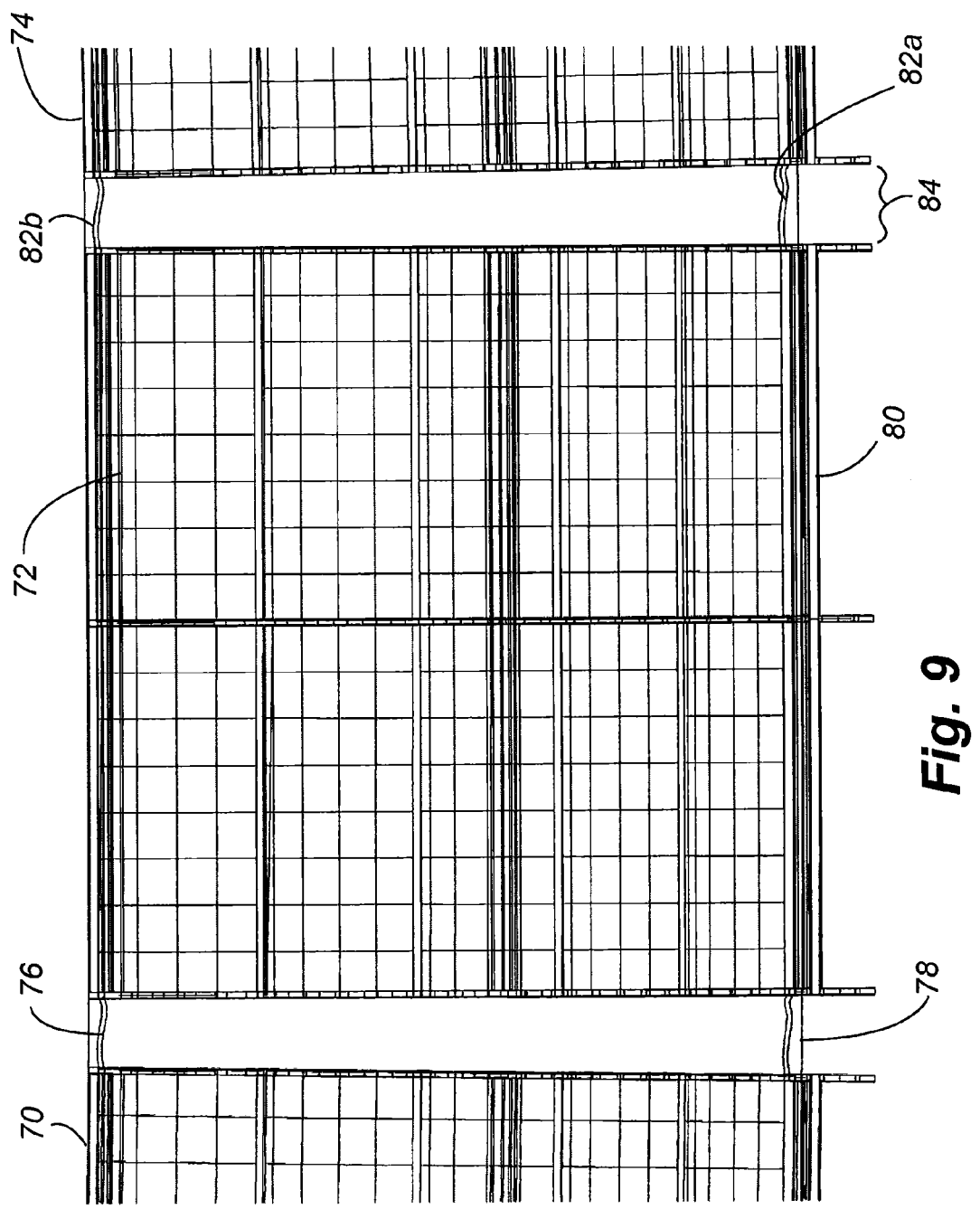
FIG. 9 is a front elevation view of several solar panel receivers linked together.

FIG. 9 is a front elevation view of several solar panel receivers linked together. Again, the solar panel receivers 70, 72, 74 are shown supported by an upper support cable 76 and a lower support cable 78, and include an optional maintenance walkway 80. Two flexible electric cables 82a, 82b are illustrated in FIG. 9, and may serve the same purposes as that noted above with respect to FIG. 8. It is clearly shown in FIG. 9 that there is a gap 84 between the solar panel receivers 70, 72, 74. The gap 84 allows the solar panel receivers 70, 72, 74 to move independently, rendering the overall array less rigid and more likely to withstand high winds. The gap 84 also prevents neighboring solar panel receivers (i.e. 70 and 72 or 74 and 74) from damaging one another in windy conditions.

Depending on the desired output of the array, the flexible electric cables 82a, 82b may be coupled to a substation for gathering produced power and providing an output. For example, the electricity gathered is inherently direct current power, an array as illustrated herein may be easily used to charge batteries or fuel cells. The power may also be used with an electrolyzer to produce hydrogen and oxygen, with the hydrogen available for use as a fuel.

Figure 10:
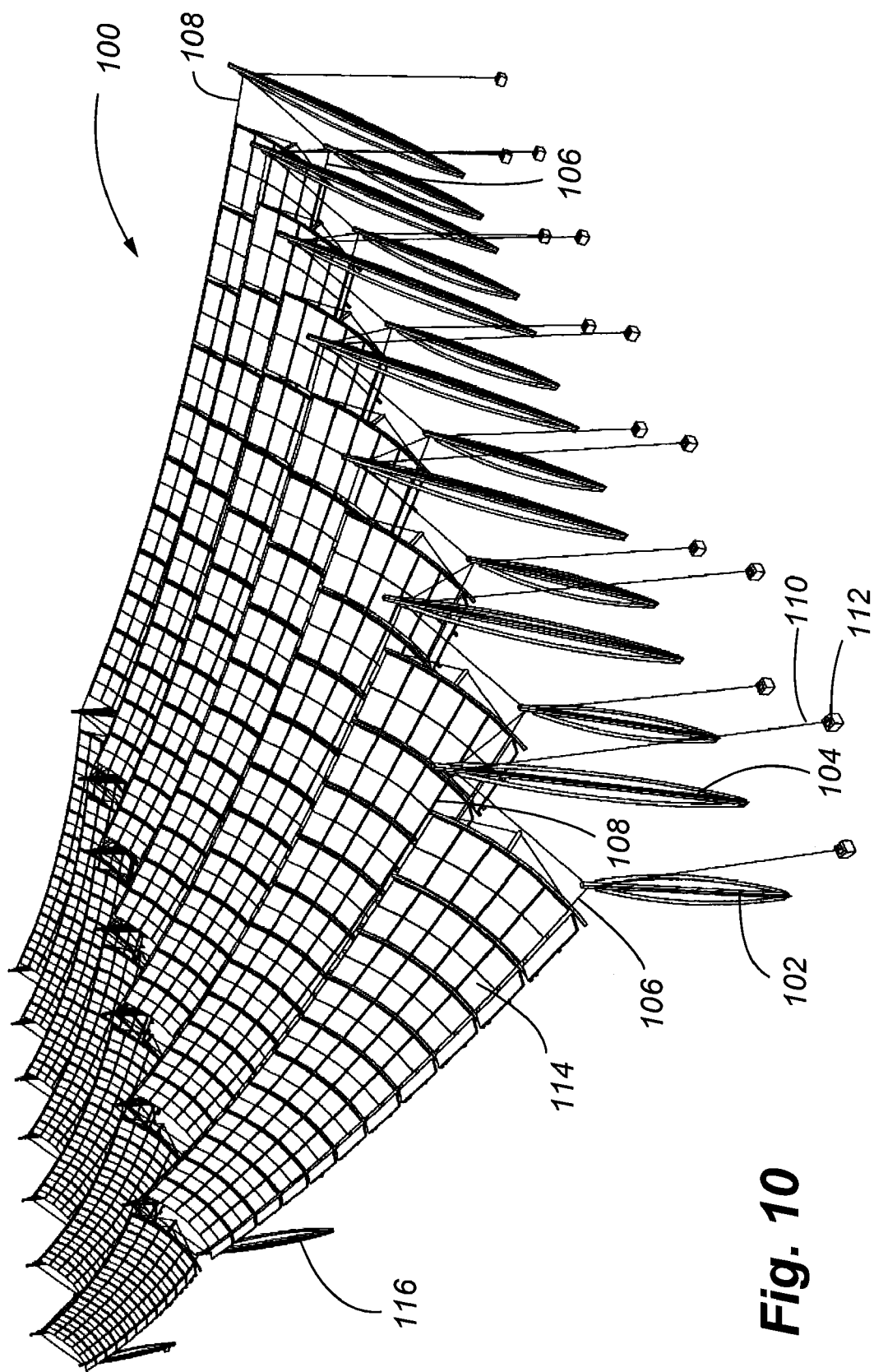
FIG. 10 is a front and side perspective view of an illustrative solar panel array including a center support member.

FIG. 10 is a perspective front and side view of an illustrative solar panel array including a center support member. The illustrative array 100 includes a number of alternating short columns 102 and tall columns 104, with support cables 106, 108 suspended from the columns 102, 104. Anchor lines 110 and anchors 112 provide additional support, and the array 100 supports a number of solar panel receivers 114. The further addition in FIG. 10 is the inclusion of a center support 116, which allows for a longer span to be covered between the outer columns 102, 104, reducing the need to place additional anchors 112. Further, because the center support 116 does not have to provide stability against lateral movement, and only needs to provide vertical support, the center support 116 may be of an even lighter weight construction than the outer columns 102, 104.

Figure 11:
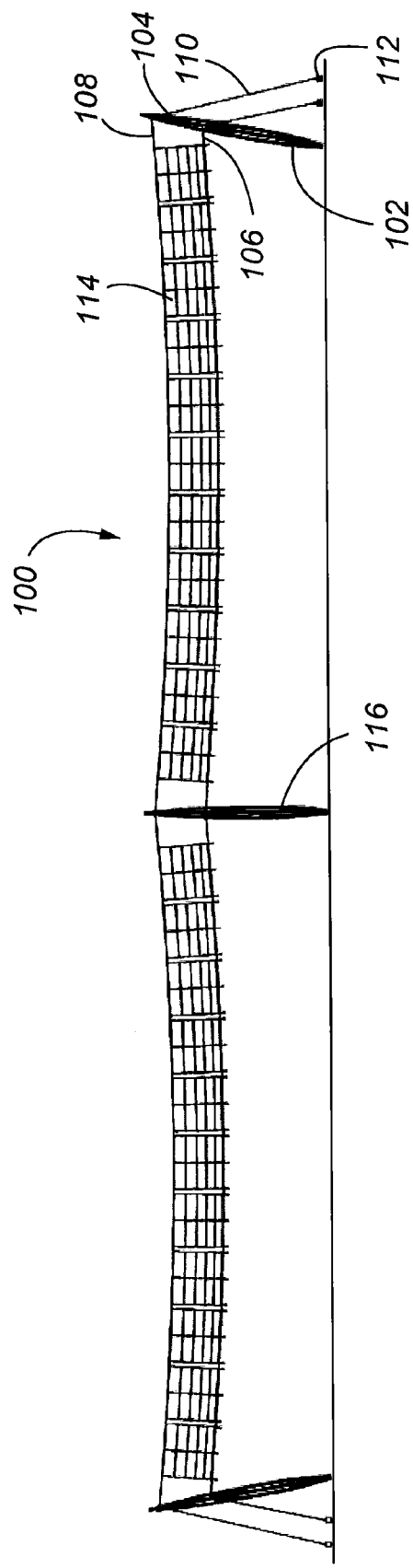
FIG. 11 is a section view showing an illustrative solar panel array including a center support member.

FIG. 11 is a section view showing an illustrative solar panel array including a center support member. Again, the array 100 is supported by the use of a short column 102, a tall column 104, a lower support cable 106 and an upper support cable 108. The array 100 is stabilized in part by the use of anchor lines 110 and anchors 112, and a number of solar panel receivers 114 are supported. The center column 116 provides a central support, but is not required to add to the lateral stability of the array 100, because there are portions of the array pulling equally on both sides of the center column 116.

Figure 12:
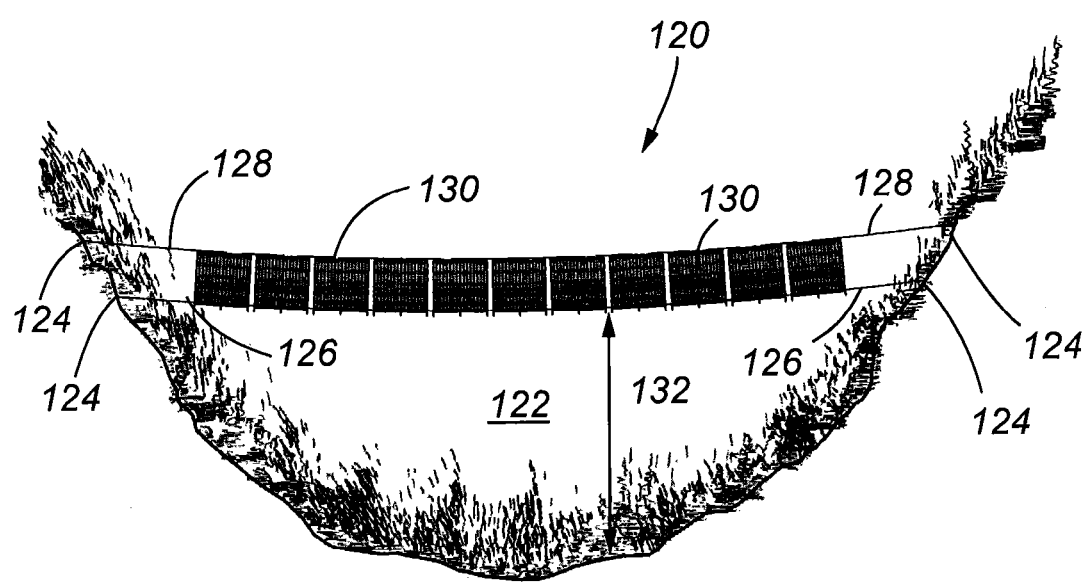
FIG. 12 is a front elevation view of an illustrative solar panel array suspended across a valley.

FIG. 12 is a front elevation view of an illustrative solar panel array suspended across a valley. An array 120 is suspended across a valley 122 by the use of four anchors 124 that enable two support cables 126, 128 to be suspended across the valley 122. A number of solar panel receivers 130 are supported by the support cables 126, 128. By suspending the array 120 across the valley 122, a desired height 132 above the valley floor can be achieved by the array. The height 132 may be sufficient to allow wildlife to pass below.

A number of potential environmental benefits of this type of structure can be identified, including that the structure provides a quiet and safe energy production array, the structure provides shade and/or shelter, and the structure can be installed without requiring a large amount of heavy machinery. The use of an array over eroding ground may encourage foliage growth in highly exposed locations, slowing erosion.

Figure 13:
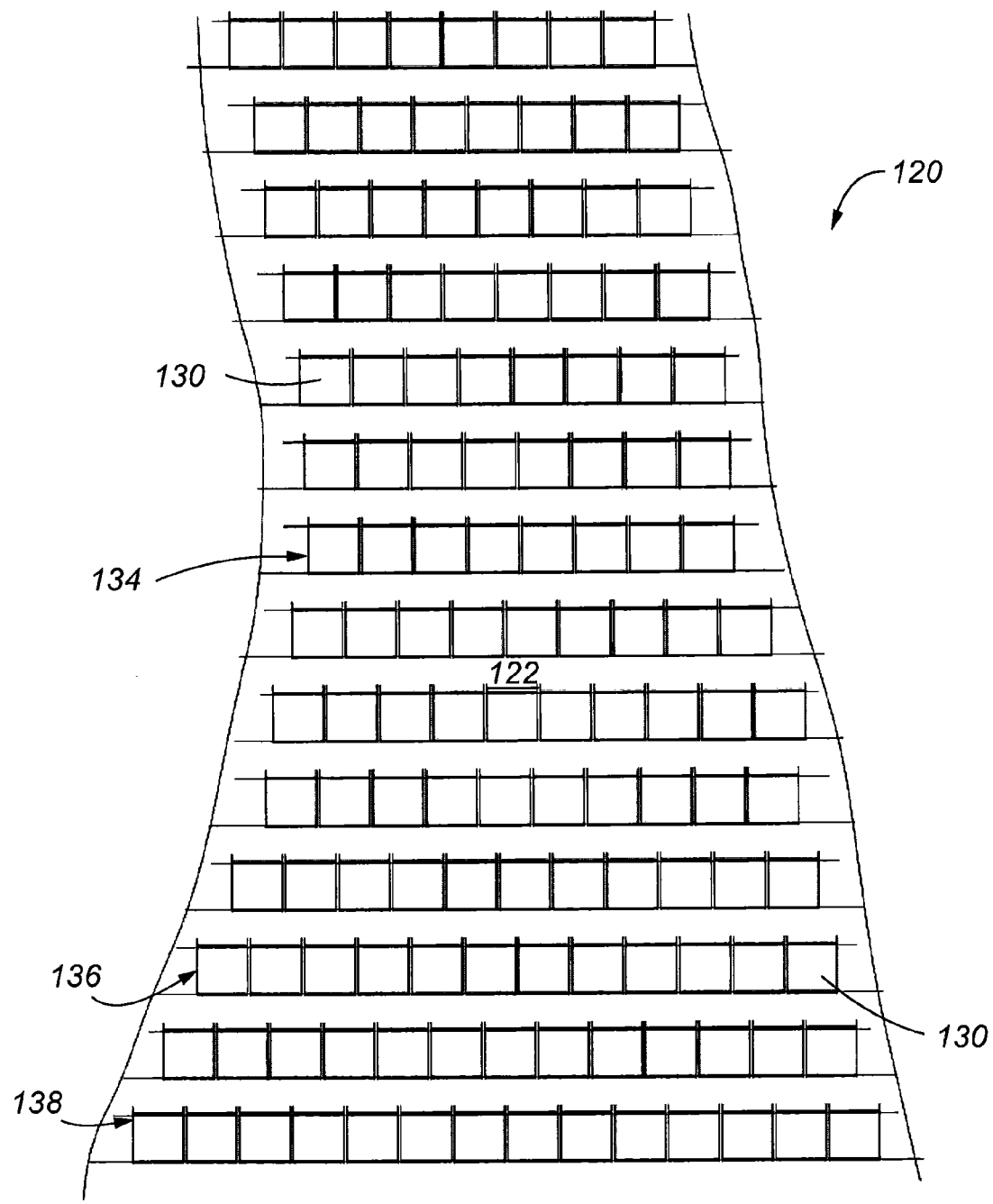
FIG. 13 is an overhead plan view of an illustrative solar panel array suspended across a valley.

FIG. 13 is an overhead plan view of an illustrative solar panel array suspended across a valley. It can be seen that the array 120 is designed to match the shape of the valley 122. In particular, the array 120 includes a number of individual lines of solar panel receivers 130. By varying the number of solar panel receivers 130 suspended by each pair of support cables, a relatively short line 134 can match a relatively narrow place in the valley 122, while longer lines 136, 138 span a wider portion of the valley 122.

Figure 14:
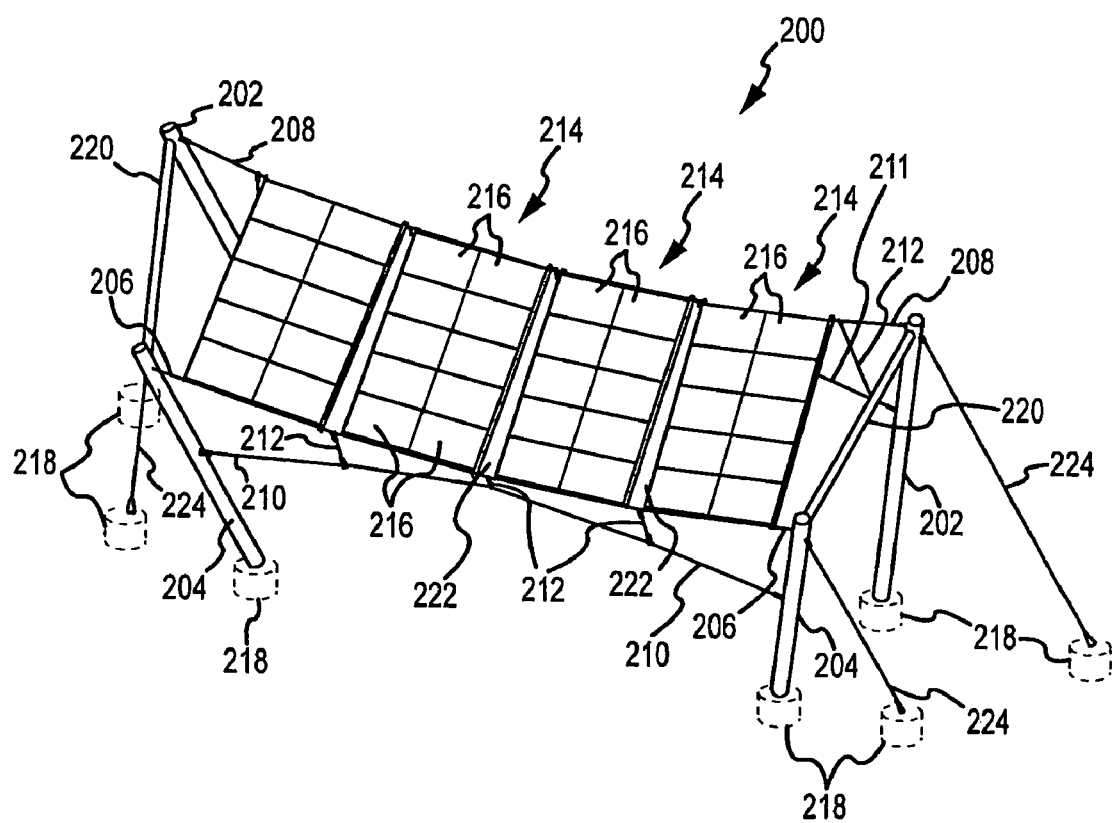
FIG. 14 is a perspective view of a solar panel array in accordance with another embodiment of the present invention.
Figure 15:
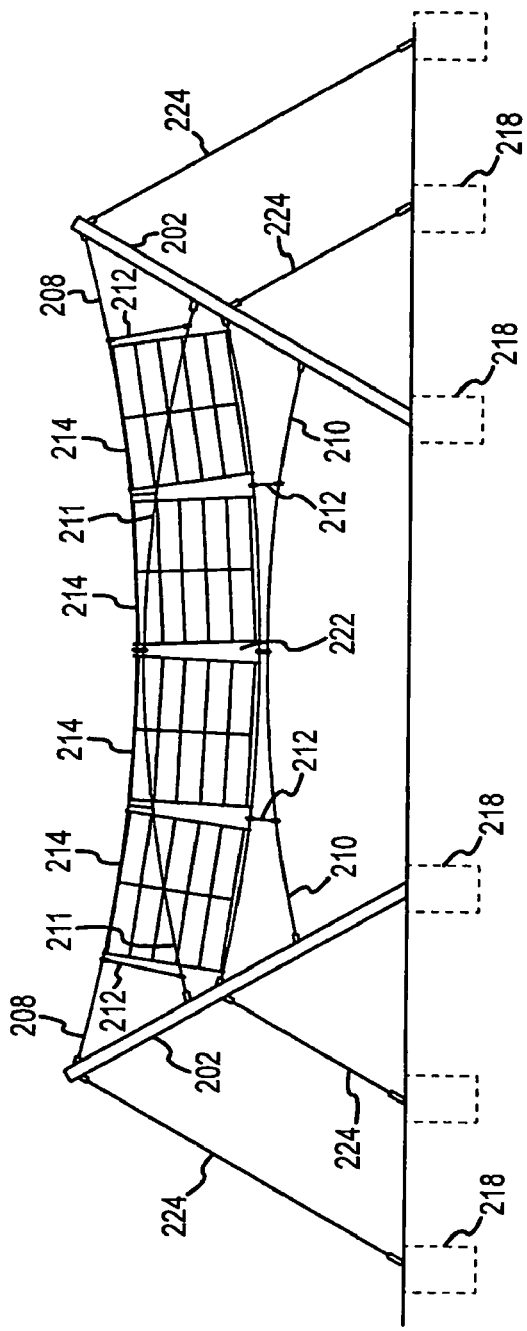
FIG. 15 is a rear elevation view of the solar panel array illustrated in FIG. 14.
Figure 16:
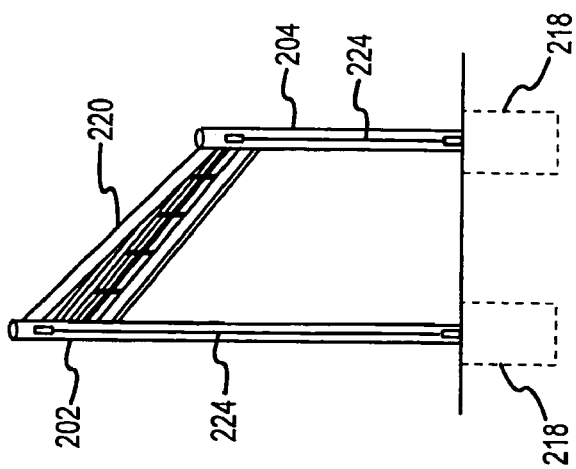
FIG. 16 is a side view of the solar panel array of FIG. 14.

FIGS. 14-16 illustrate yet another preferred embodiment of the present invention, in the form of a solar panel array 200 comprising a plurality of receivers or pods 214 supported by another arrangement of cables and columns. More specifically, FIGS. 14 and 15 illustrate a plurality of spaced pods 214 each containing a number of solar panels 216, a first cable 206 supporting one end of the pods, and a second cable 208 supporting an opposite end of the pods. First cable 206 is strung between short columns 204, while second cable 208 is strung between tall columns 202. A pair of complementary support cables is also provided to further support the pods 214, namely, a front complementary support cable 210 and a rear complementary support cable 211. Cables 210 and 211 are particularly useful in resisting upward forces generated by wind loads. A number of vertically oriented connecting cables 212 interconnect the complementary support cables 210 and 211 to their corresponding first and second cables 206 and 208. The embodiment of FIGS. 14-16 also includes cross-supports 220 that extend between the columns 202 and 204. Members 202, 204, and 220 may be metallic and made of material such as steel or aluminum, and these members may be configured as I-beams, channels, tubular members, and others. The gaps 222 provided between the pods 214 allow wind to pass between the pods to therefore prevent damage to the system during high wind conditions. Anchor lines 224 extend from each of the columns to respective anchors 218. It shall be understood that additional anchor lines 224 can be added to provide the necessary support to the columns. FIG. 15 is a rear elevation of the embodiment of FIG. 14, better illustrating the complementary support cables 210 and 211. The side view of FIG. 16 also illustrates that the anchor lines 224 may be placed in-line with the columns to minimize the side profile of the system. FIGS. 14-16 also show a number of other geometrical features defining the construction and overall appearance of the system. For example, the complementary support cables are coplanar with their corresponding first/second cables. The panel receivers have a first end residing at a first height, and a second end residing at a second lower height. Thee panel receivers are substantially rectangular shaped and evenly spaced from one another along the first and second cables. The first cable defines a first curvature, the second cable defines a second curvature extending substantially parallel to the first curvature. The complementary support cables have a generally opposite curvature as compared to the first and second cables, and the complementary support cables also extend substantially parallel to one another. The gaps between each panel are may be substantially triangular shaped such that the portions of the gaps located adjacent the second cable are smaller than the portions of the gaps located adjacent the first cable. As also shown in the FIGS. 15 and 16, the columns 202 and 204 extend at an angle from the mounting surface such that the upper ends of the columns are further apart from one another as compared to the lower ends of the columns. Angling the columns towards the outside of the structure in this manner increases the structure's efficiency to resist horizontal forces such as wind or seismic loads, and thus enables a reduction in the required size of the anchor lines 224 and anchors 218.

Depending upon the location where the solar panel array is to be installed, it may be necessary to adjust the location of the columns in order to take advantage of available ground space and to maximize the area to be covered by the solar panel array. For example, if the solar panel array is used to cover a parking lot, it may be necessary to adjust the location of the columns based upon available space in the parking lot, yet maximizing the overall area covered by the solar panels by the non-vertical columns. Thus, in the embodiment of FIGS. 14-16, the group of pods can extend over a greater overall area as opposed to use of vertical columns anchored at the same column locations Additionally, there may also be some aesthetic benefits achieved in arranging the columns in various combinations of both vertical and angular extensions from the mounting surface.

Figure 17:
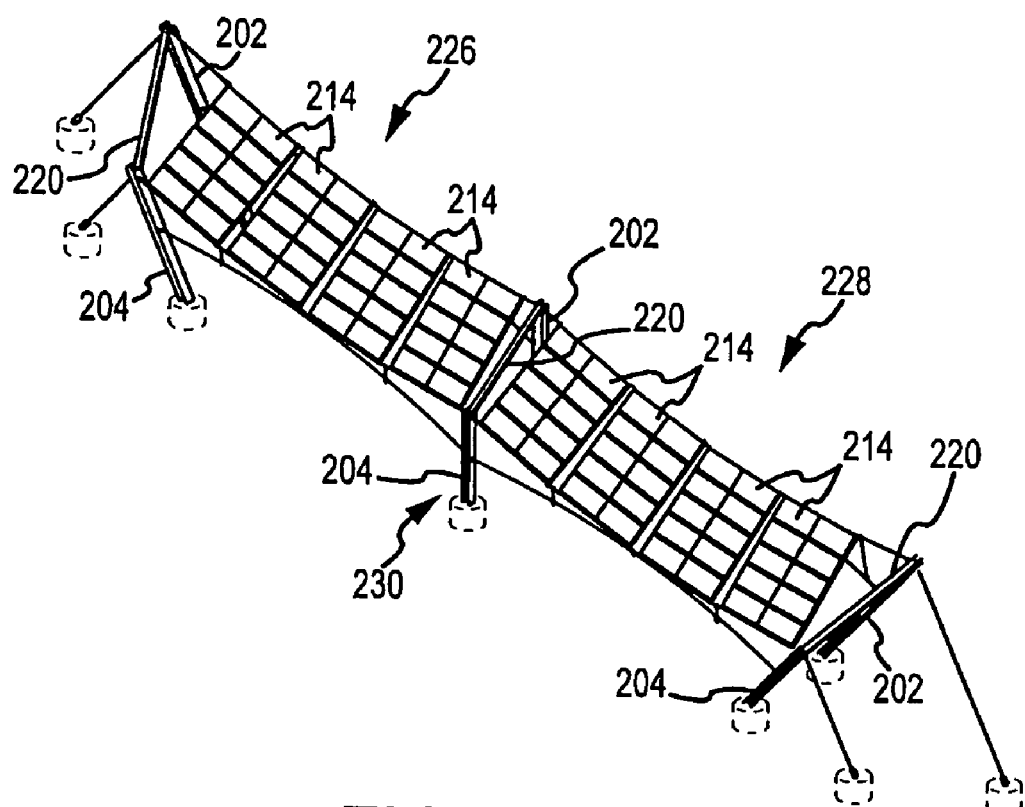
FIG. 17 is a perspective view of a solar panel array in yet another embodiment of the present invention.
Figure 18:
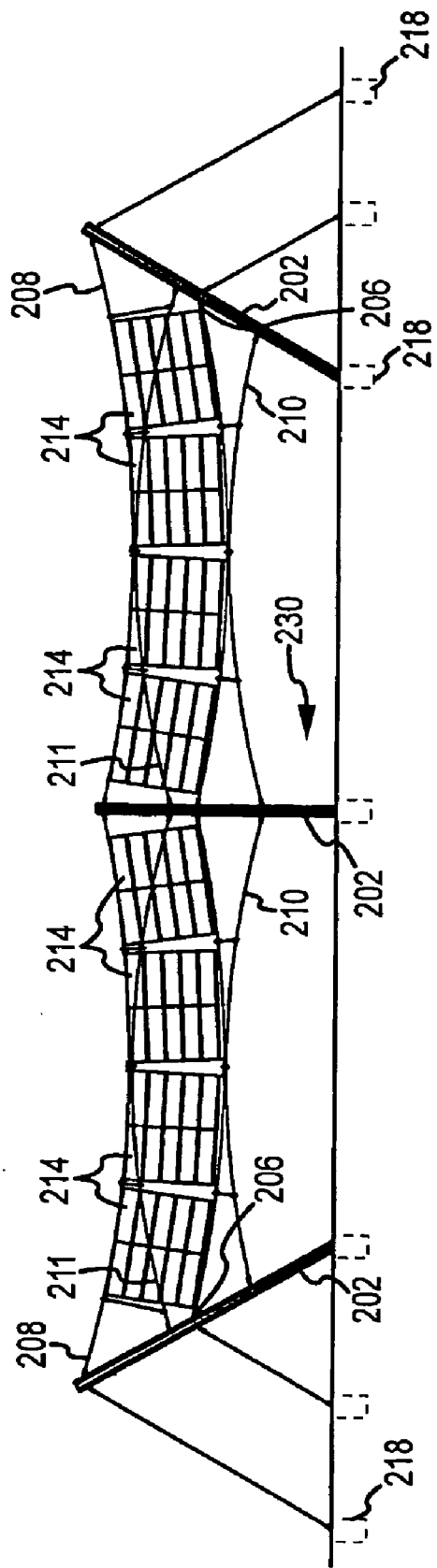
FIG. 18 is a rear elevation view of the embodiment of FIG. 17.

FIG. 17 illustrates yet another embodiment of the present invention. In this embodiment, an intermediate support 230 is provided that extends vertically from the ground, while the outside or exterior columns extend at an angle, like those illustrated in FIG. 15. In this embodiment, the pods or receivers can also be defined as corresponding to a first group 226 and a second group 228. In the first group, the pods extend between one of the exterior column pairs and the intermediate support 230, while the other group 228 of pods extends between the opposite exterior column pair and the intermediate support 230. FIG. 18 is a rear elevation view of the embodiment of FIG. 17, further disclosing particular details of this embodiment to include the complementary support cables 210 and 211.

Figure 19:
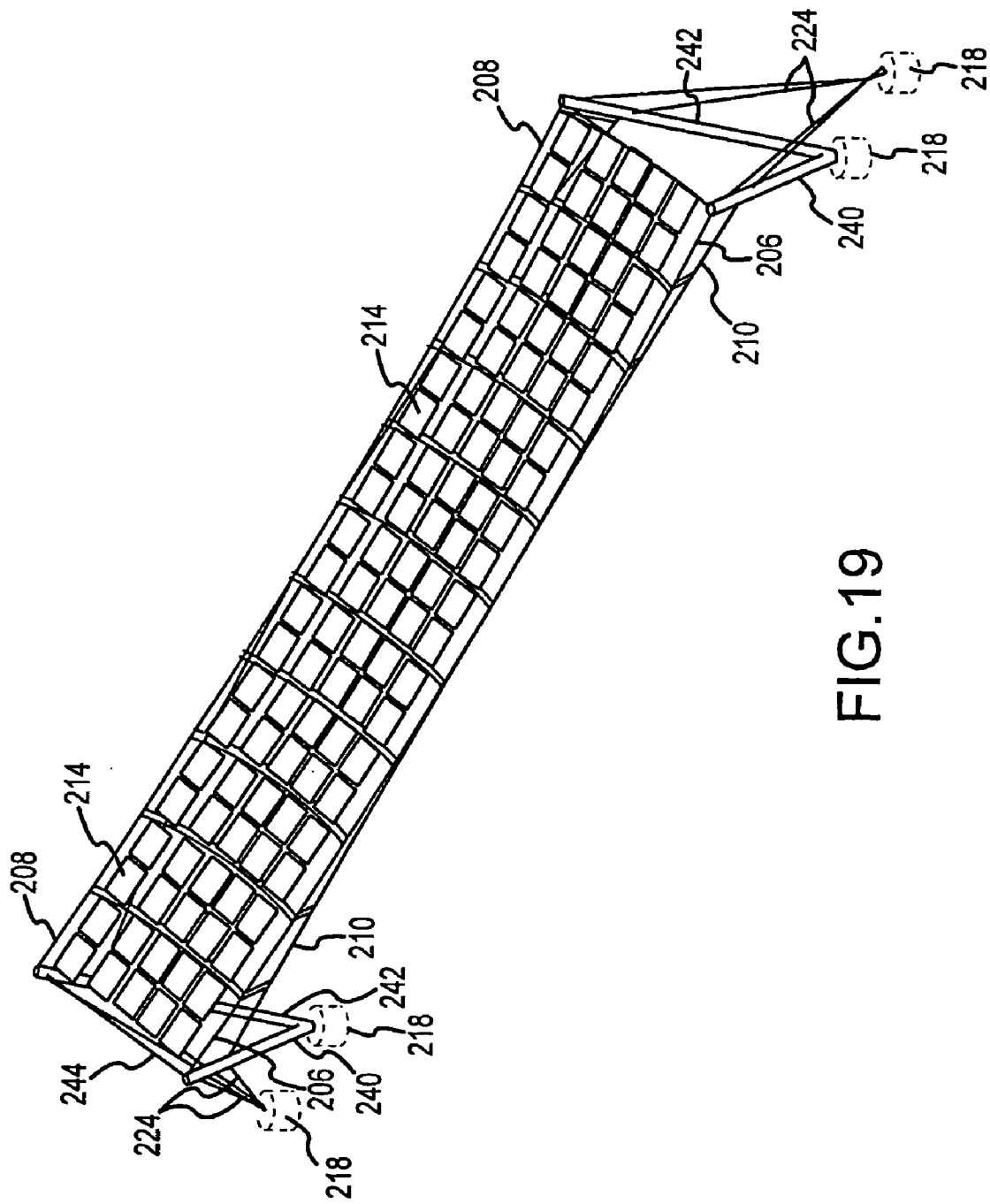
FIG. 19 is a perspective view of yet another solar panel array embodiment in accordance with the present invention.

FIG. 19 illustrates yet another preferred embodiment of the present invention. In this embodiment, in lieu of single columns that are secured to the mounting surface, the columns 240 and 242 are arranged in a V-shaped configuration. The lower ends of the columns 240 and 242 are anchored at the same location while the upper ends of the columns 240 and 242 diverge from one another. As with each of the previous embodiments, the V-configured columns 240 and 242 may be made of tubular members or other types of metallic members. As also shown, the anchor lines 224 for each pair of the V-configured columns may be oriented so that there is a single anchor point 218 from which the anchor lines extend. The V-shaped columns minimize the number of anchors/foundations 218 required for the array structure.

Figure 20:
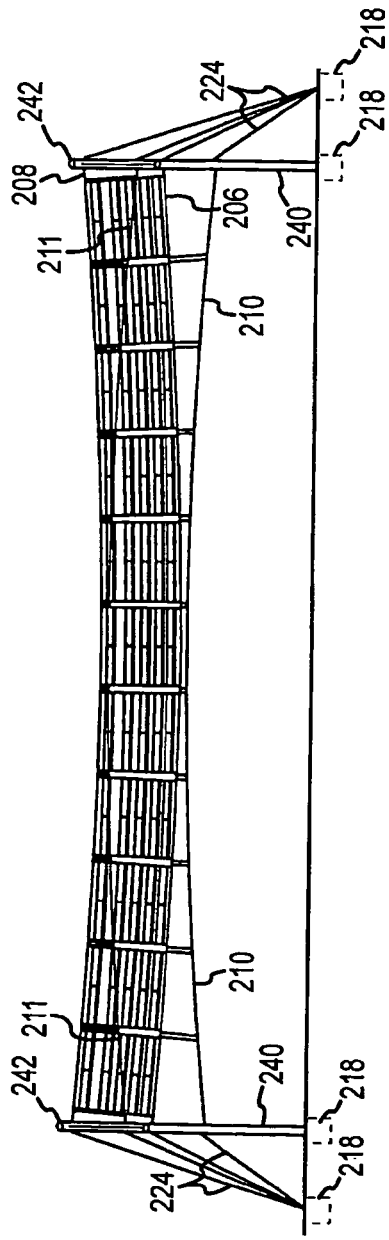
FIG. 20 is a rear elevation view of the embodiment of FIG. 19.
Figure 21:
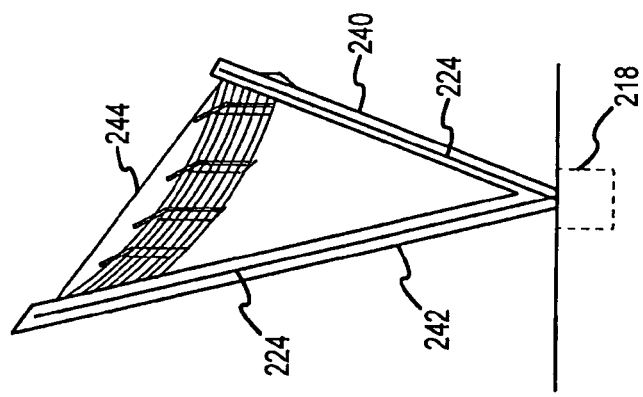
FIG. 21 is an enlarged side view of the embodiment of FIG. 19.

Referring to FIG. 20, a rear elevation view is provided of the embodiment of FIG. 19. This Figure also shows the manner in which the various anchor lines 224 for each column pair terminate at a common anchor point 218. FIG. 21 illustrates the manner in which the anchor lines 224 may extend in a V-shaped configuration to match the columns 240 and 242 and thus minimizing the side profile of the system. Additionally, in this embodiment a stabilizing cable 244 may be provided that extends between the upper ends of the column pairs.

Figure 22:
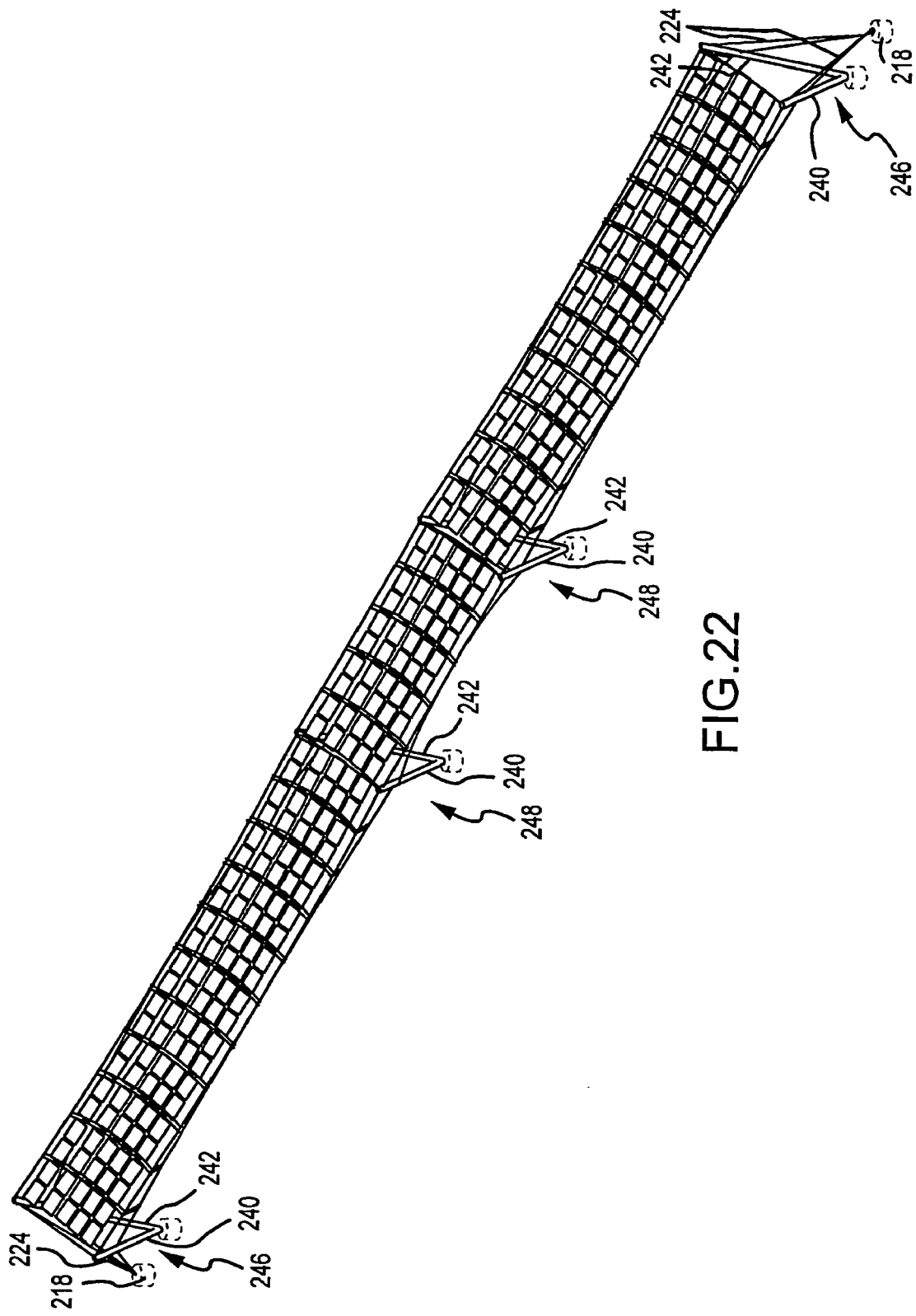
FIG. 22 illustrates yet another solar panel array embodiment in accordance with the present invention.

FIG. 22 illustrates yet another preferred embodiment of the present invention, wherein the V-shaped column supports 240 and 242 are utilized in an extended row of pods 214. More specifically, a pair of outside or end columns 246 are provided along with a pair of intermediate columns 248. Based upon the required length of the row, the necessary combination of intermediate column supports can be provided for adequate structural support.

Figure 23:
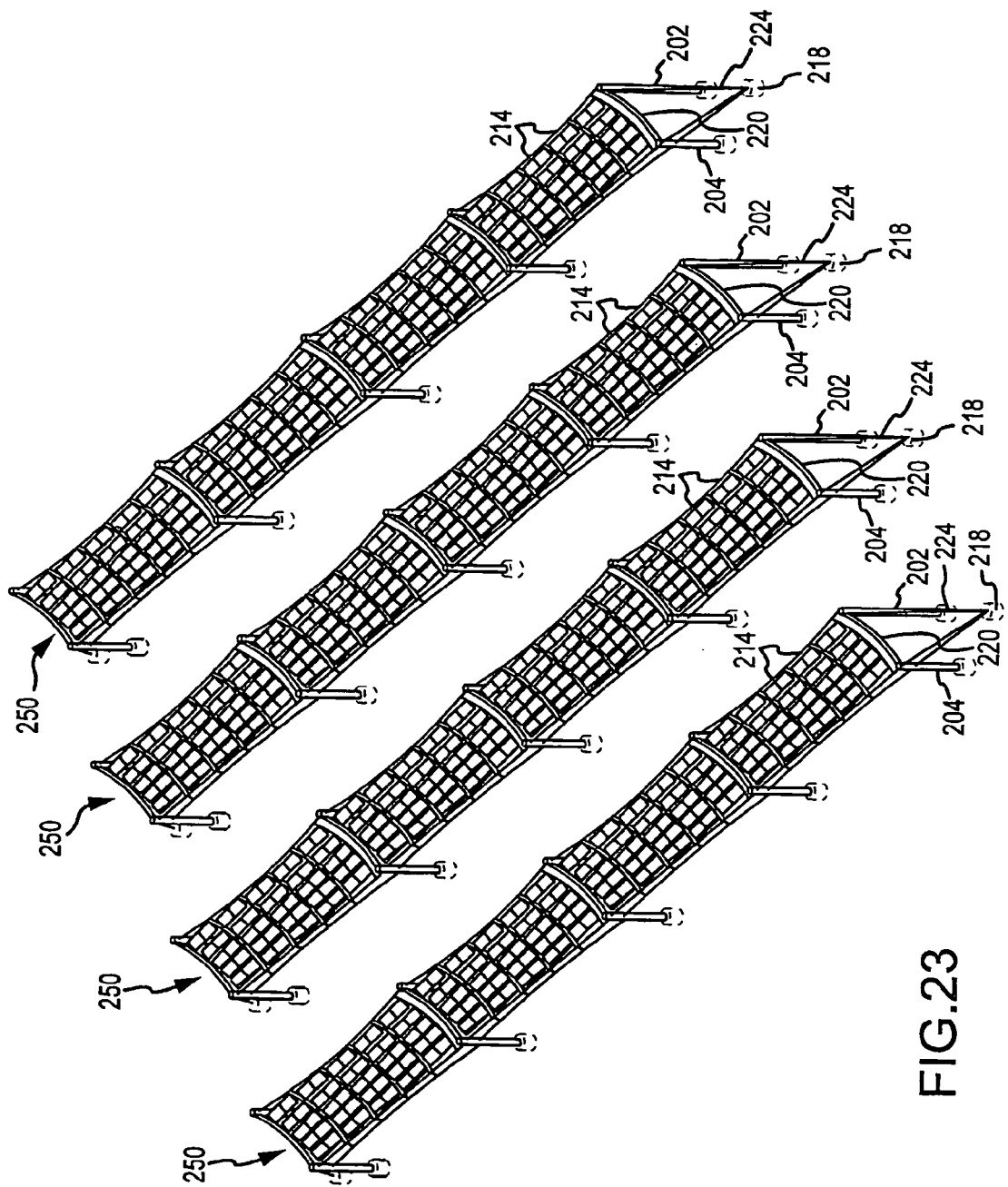
FIG. 23 is a perspective view of a plurality of rows of solar panel arrays.

Referring to FIG. 23, yet another embodiment of the present invention is illustrated comprising a plurality of rows 250 of solar panel arrays and wherein the column supports 202 and 204 extend substantially vertically from the mounting surface. In this embodiment, it is noted that the anchor lines 224 for each column pair extend to a common anchor point 218. The rows 250 may be selectively spaced from one another to provide the optimal area coverage for the solar panel arrays, as well as optimal shade in the event the arrays are used to cover a structure such as a parking lot. Thus, it shall be understood that the rows 250 may be either spaced more closely to one another, or farther apart depending upon the particular purpose of installation.

Figure 24:
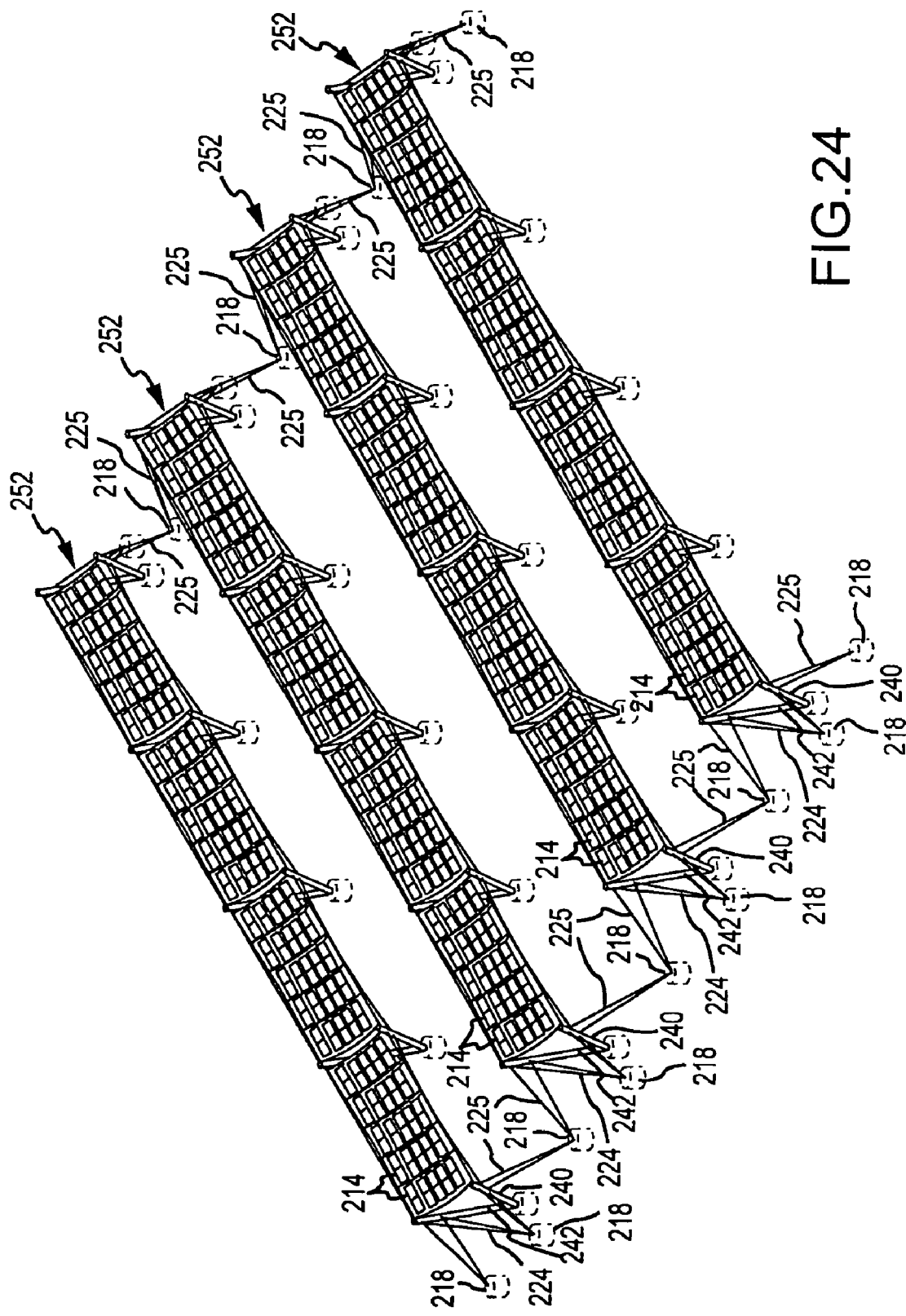
FIG. 24 is another perspective view of a plurality of rows of solar panel arrays.

FIG. 24 illustrates yet another preferred embodiment of the present invention, showing a plurality of rows 252 of solar panel arrays wherein the V-column configuration is used with column supports 240 and 242. As with the embodiment shown in FIG. 23, the rows 252 may be either spaced more closely to one another, or farther apart depending upon the particular purpose of installation. FIG. 24 also illustrates some additional anchor lines 225 that are used to further stabilize the rows 252 of solar panel arrays. These anchor lines 225 are particularly advantageous in handling laterally directed forces, such as wind.

With each of the embodiments of the present invention, it shall be understood that the particular height at which the solar panels are located can be selectively adjusted for the particular purpose of installation.

Figure 25:
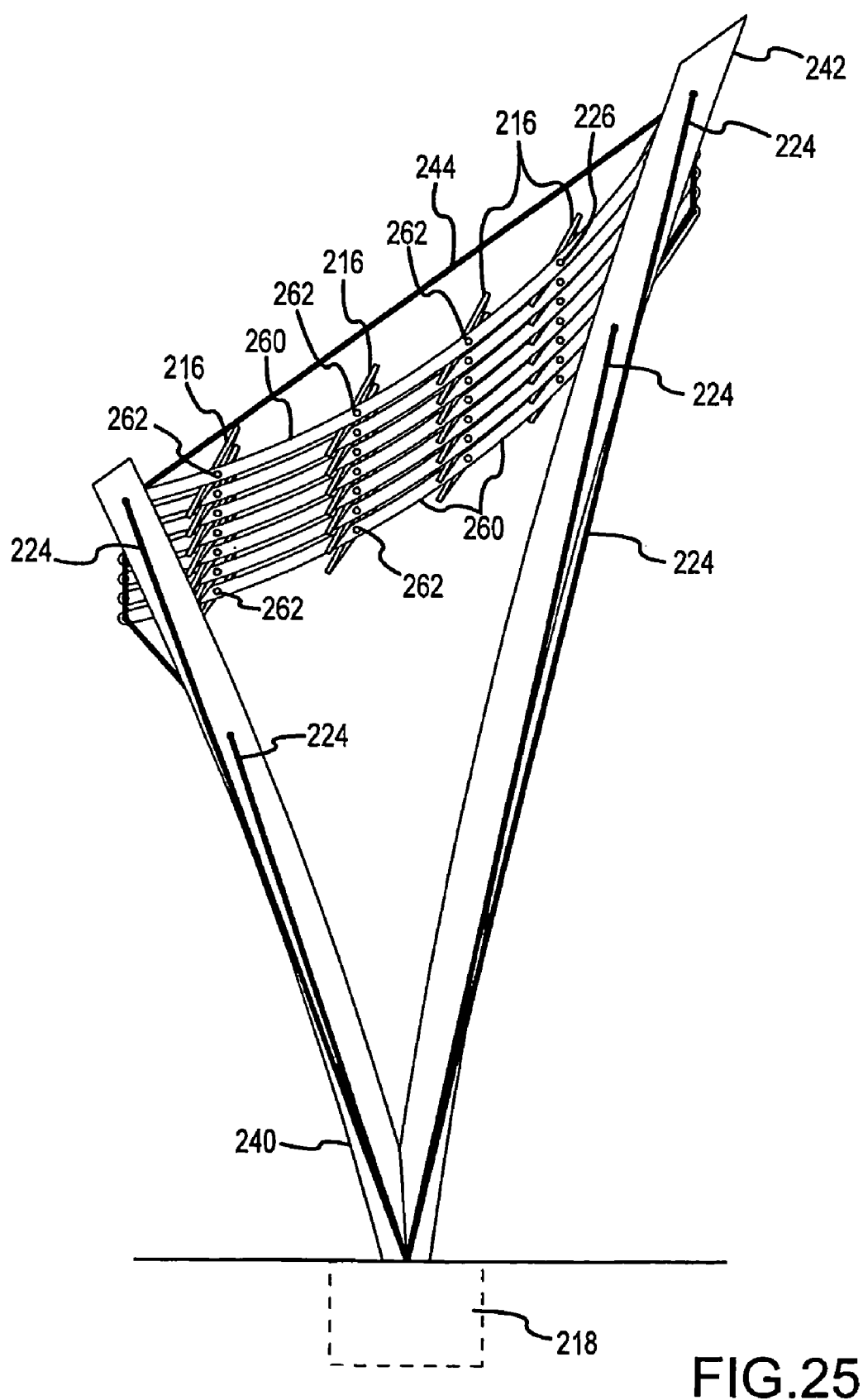
FIG. 25 is a side view of a solar panel array in yet another embodiment of the present invention.

FIG. 25 illustrates yet another preferred embodiment of the present invention, wherein each of the solar panels 216 may be rotatably mounted to their corresponding supporting pod or receiver. As shown, the embodiment of FIG. 25 incorporates curved struts 260 and pivot mounts 262 that enable each of the solar panels 216 to be disposed at a desired angle with respect to the sun. The pivot mounts 262 can take a number of forms. For example, a pivot mount 262 could include a continuous member such as a steel rod or square tubular member that extends horizontally across the corresponding pod or receiver and which is secured to an overlying solar panel 216. The rod is then rotatably mounted within the receiver such that the solar panels 216 can be grasped and rotated to the desired inclination with respect to an optimal sun-capturing orientation. This configuration of mounting the solar panels on a round or square tube provides additional strength and rigidity to the pod structures, and reduces torsional and in-plane forces exerted on the panels from wind loads that cause the pods to move in the wind.

Figure 26:
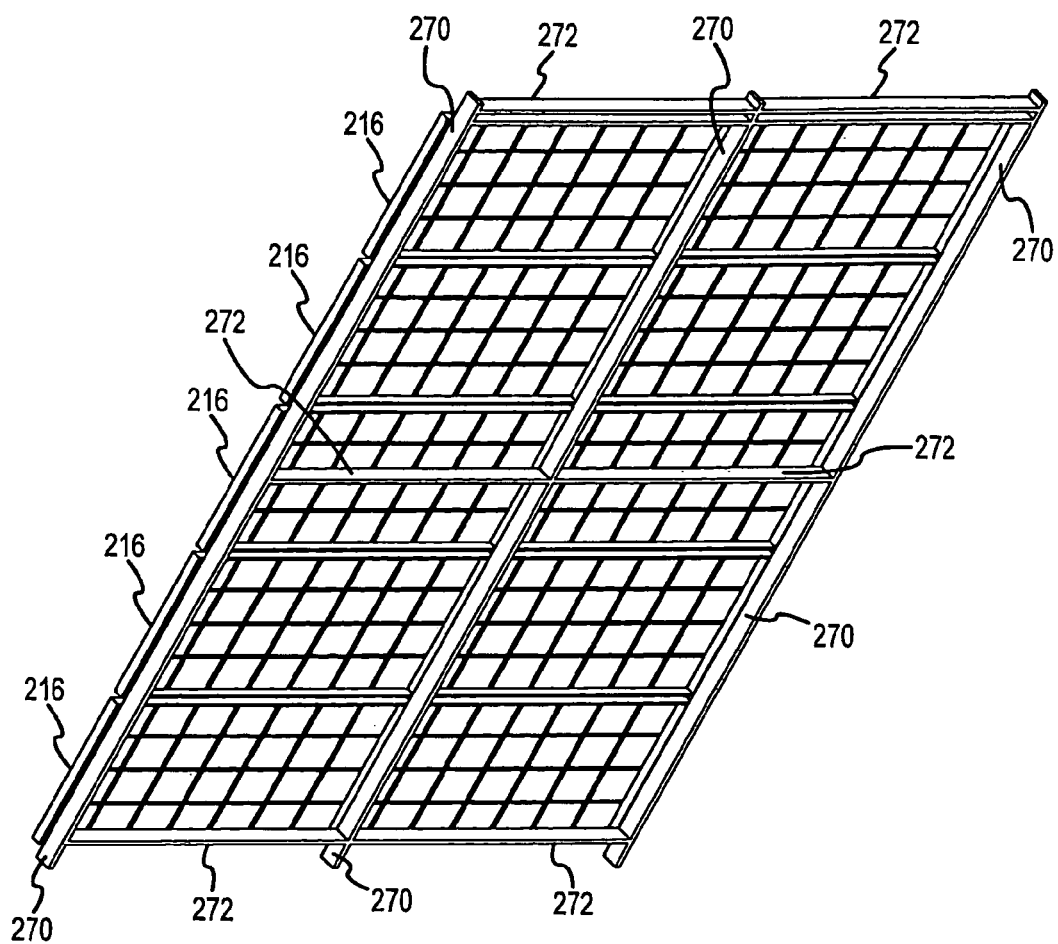
FIG. 26 is an enlarged perspective view of another illustrative pod used to support a plurality of solar panels in the present invention

FIG. 26 illustrates a pod or receiver that may incorporate a group of linear or straight struts. As shown, a plurality of first struts 270, and a plurality of second orthogonally oriented struts 272 are provided to support the solar panels 216 mounted to the pod. The receiver shown in FIG. 26 supports a group of ten solar panels 216 arranged in a 2 by 5 matrix. A width of the pod may be defined as the distance between the most outer or exterior struts 270, and a height of the pod may be defined as the distance between the most outer or exterior second struts 272. The height of the pod can be increased by extending the length of the struts 270 but not requiring the cables 206 and 208 to be secured at the opposite ends of the pod which would require the cables 206 and 208 to be spread further apart and therefore widening the overall size of the array. For this extended pod length, the cables 206 remain attached at their normal spacing and the extended ends of the struts 270 simply extend beyond the cables in a cantilevered arrangement. In this alternate pod construction, additional solar panels can be added to increase the power producing capability of the array without adjusting other design parameters. The spacing of the pods when mounted to the cables depends on a number of factors to such as the weight of the pods and panels, wind conditions, snow loading conditions and others. In one aspect of the invention, spacing the pods with gaps between the pods that does not exceed the widths of the pods is acceptable for some installations.

For the illustrative pod shown in FIG. 26, cable receivers 58 and 60 may be incorporated thereon to allow the pod attach to the cables 206 and 208. As previously mentioned, while the cable receivers may be simply openings formed in the ends of the pods, the cable receivers may take another form such as a mechanism which selectively locks the pod onto the cable and therefore, allows a pod to be removed for maintenance or replacement. Accordingly, it shall be understood that the pods can be removed from the cables as necessary to either generate another different combination of pod arrangements, or to selectively replace/repair defective solar panels.

FIG. 27 illustrates another embodiment of the present invention shown as solar array 300 comprising three rows or linear extending groups of panel receivers/pods 302, 304, and 306. Exterior rows 302 and 306 are of the same construction, and are supported at their ends by corresponding columns 316. Thus, the columns 316 are located at the corners of the rectangular shaped solar array. In this embodiment, the columns 316 are v-shaped with their lower ends received in a common anchor/footer, and their upper ends diverging away from one another and being curved as shown. The cables used to support the pods 322 in this embodiment are similar to what is illustrated in the embodiment of FIG. 14; however, in the embodiment of FIG. 27, the pods 322 are oriented so as to extend more parallel with respect to the surface of the ground as explained in more detail below with reference to FIGS. 32 and 33. Row 304 is suspended between rows 302 and 306, and there are no end supporting columns that directly support row 304; rather, row 304 is supported only by the upper cables 308 extending on opposite lateral sides of row 304, and which also support the respective lateral sides of the adjacent rows 302 and 306. As shown in FIG. 28, complementary lower cables 310 are disposed below the upper cables 308, and have an opposite curvature as compared to cable 308. Vertically oriented interconnecting cables 312 connect cables 308 and cables 310. A cross-support cable or bar 314 is provided between the upper diverging ends of the column members 316. A plurality of anchor cables 318 interconnects the columns 316 and anchor points 320 as also shown in FIG. 28.

As also shown in FIG. 27, the pods 322 in row 302 and the pods 322 in row 306 have a convex curvature when viewing the array from above, while row 304 has a concave curvature when viewed from above. This compound curvature arrangement of rows 302, 304, and 306 provides a wave-like appearance, and may offer certain benefits such as limiting wind and snow loading conditions, as well as providing greater options in terms of how the array may be oriented to best capture direct sunlight.

Referring to FIG. 29, it is shown that the rows 302, 304, and 306 extend straight or linearly, and parallel to one another. The embodiment of FIG. 27 provides an array of pods in a 3×11 configuration; however, it shall be understood that the length of the array may be modified to best fit the particular installation needs and therefore the rows of pods may incorporate fewer or more pods as needed. If the length of the pod is to be increased, then interior columns may be provided between spans as explained below with reference to embodiments such as shown in FIGS. 36-41.

Figure 30:
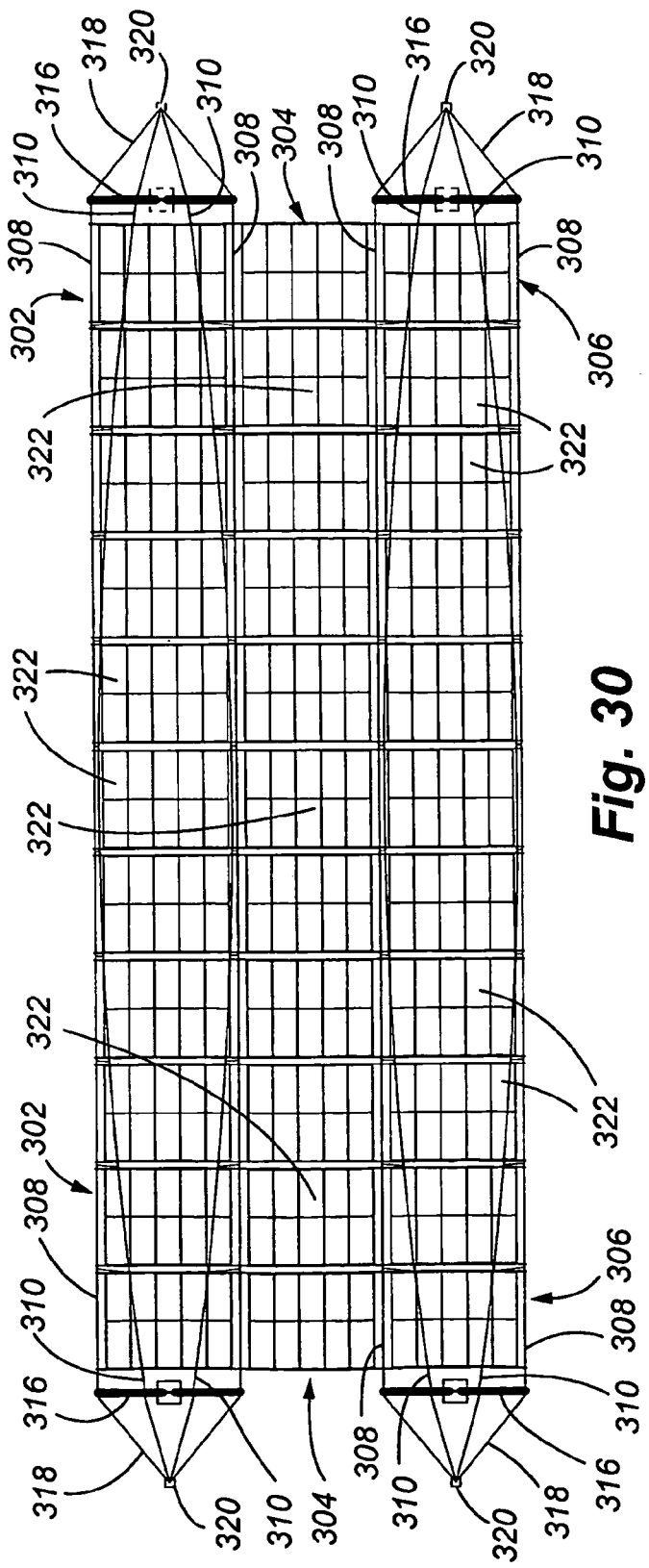
FIG. 30 is a bottom plan view of the embodiment of FIG. 27.
Figure 31:
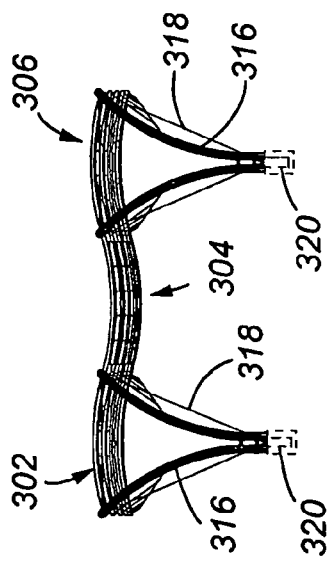
FIG. 31 is a side view of the embodiment of FIG. 27.

The bottom plan view of FIG. 30 further illustrates the particular arrangement of cables to include how complementary lower cables 310 are secured to the respective column members 316, and then extend in an arc or curve along the length of the respective rows. FIG. 31 further illustrates the convex and concave compound curvatures of the array when viewed from a side view of the array.

Figure 32:
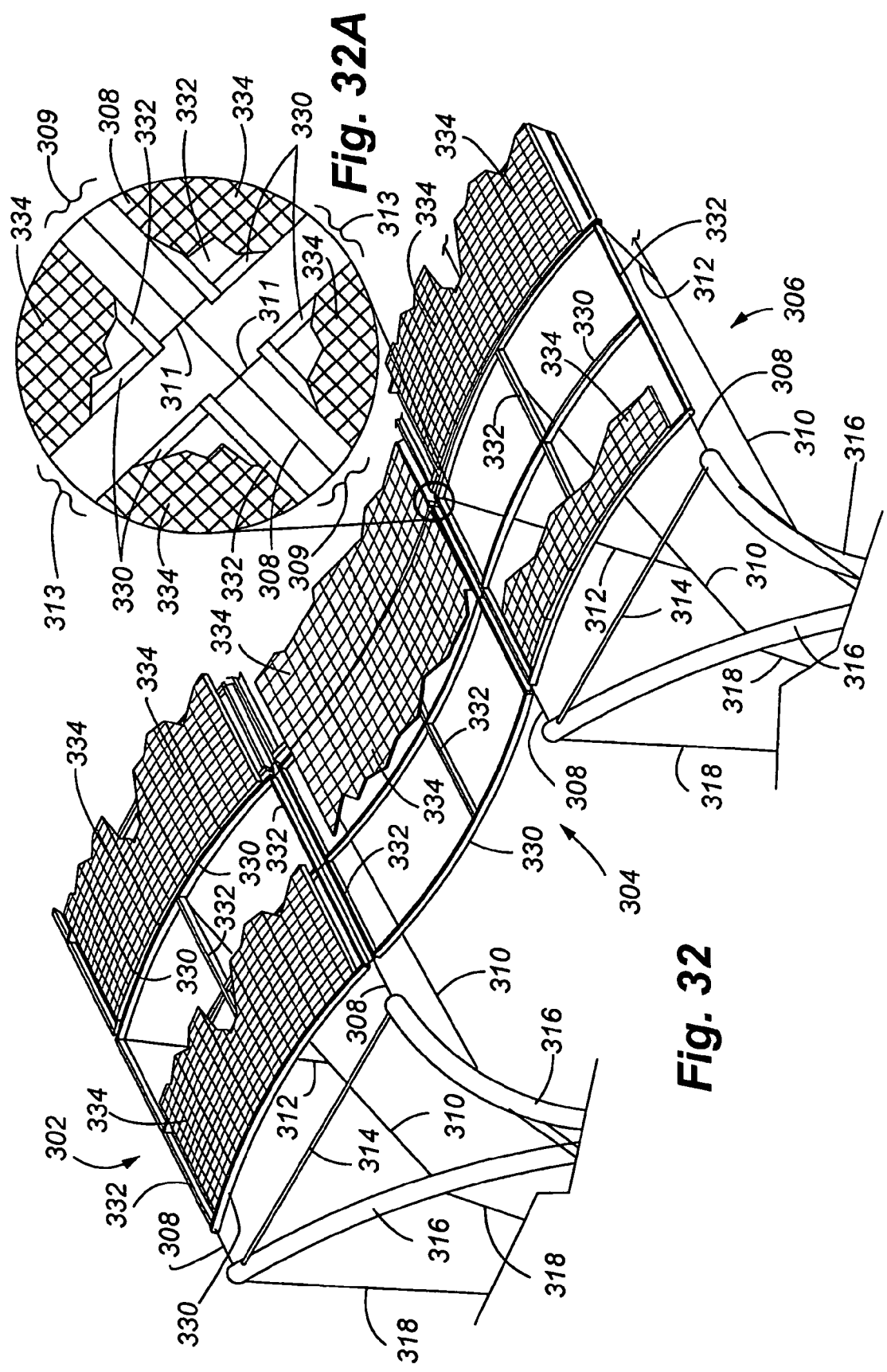
FIG. 32 is an enlarged fragmentary perspective view of the embodiment of FIG. 27 illustrating details of the pod constructions, cable connections, and the manner in which the solar panels are mounted to the curved struts of the panel receiver/pod rows.

Referring to FIG. 32, this enlarged fragmentary perspective view illustrates the manner in which the solar panels 334 may be mounted to the panel receivers/pods. The solar panels 334 are mounted to the collection of curved struts 330 and perpendicularly oriented and straight/linear struts 332. Specifically, each pod is shown as having a group of three curved struts 330, and three straight struts 332; however depending upon loading conditions, enough structural support may be provided by only use of two curved struts 330 and two straight struts 332. The spacing of such a 2×2 strut arrangement can be designed to provide maximum support to the overlying solar panels. For example, it may be desirable to space the 2×2 arrangement of struts so that there is some overhang of the solar panels beyond the outside edges of the struts. For rows 302 and 306, the curved struts are placed in an orientation such that the ends curve downward and the middle portion or area of the curved struts extend above the ends. For row 304, the curved struts are reversed so that the ends curve upward and the middle area of the struts are disposed below the ends. The curvature of struts 330 in rows 302 and 306 provides the overhead convex appearance, while the curvature of struts 330 in row 304 provides the overhead concave appearance.

Referring to FIG. 32A, a greatly enlarged plan view of a section of FIG. 32 is shown. This view shows the intersection of four panel receivers/pods wherein a longitudinal gap 309 separates the pods between rows, and a transverse gap 313 separates the transverse group of three pods across the width of the array. The upper cable 308 bisects the longitudinal gap 309 between the facing struts 332. Interconnecting members 311 span the gap 309 and interconnect the facing ends of struts 332. Interconnecting members 311 may be, for example small sections of cable, or could be more rigid members such as rods or plates. In the event more rigid members such as rods or plates are used, a moment connection can be incorporated where the members 311 attach to the respective ends of the struts 332. It is also contemplated that in order to increase array rigidity or stability, additional members 311 may be placed to span the gaps 313 and therefore interconnect the facing curved struts 330.

Figure 33:
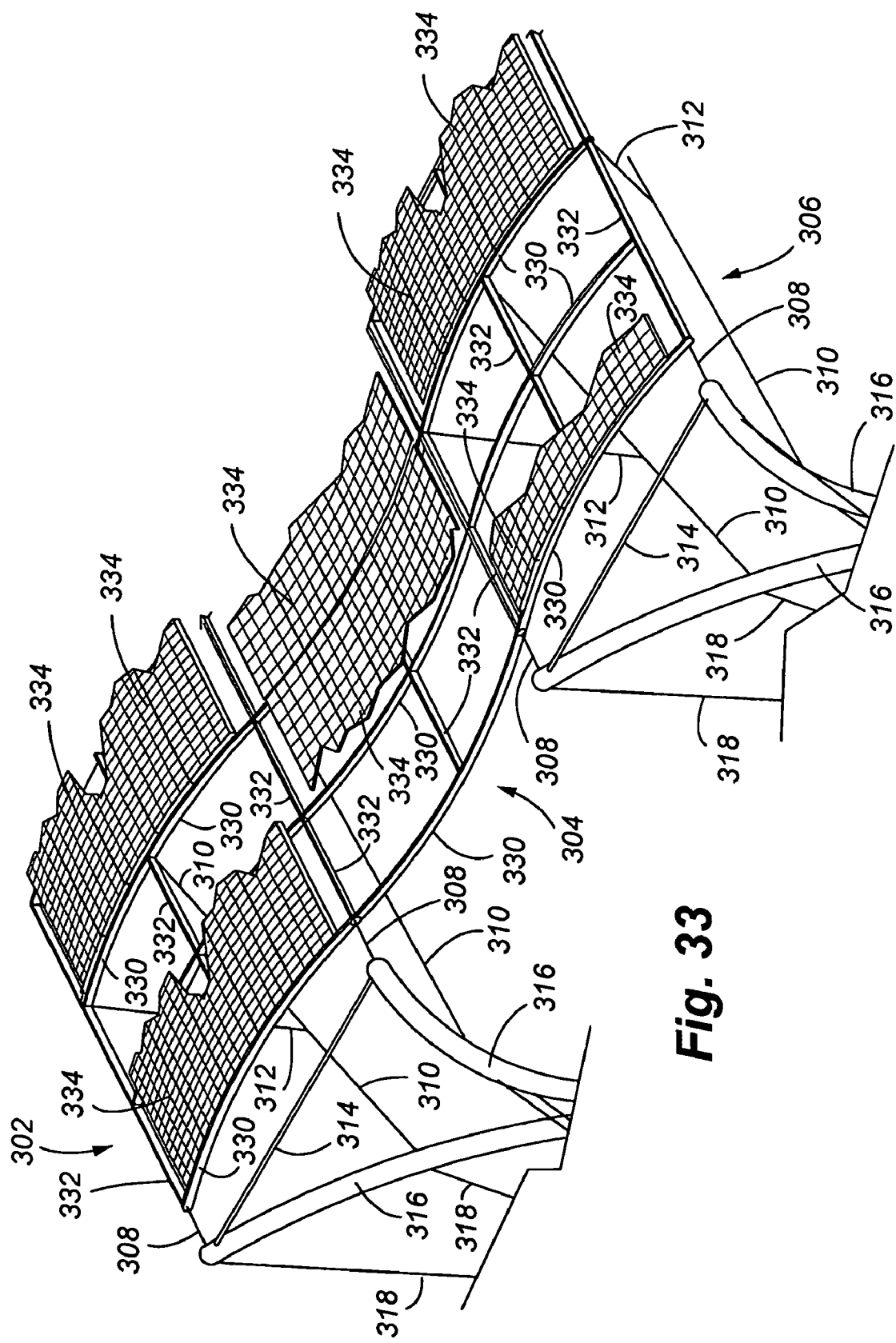
FIG. 33 is another enlarged fragmentary perspective view of the embodiment of FIG. 27, but illustrating an alternative construction for the curved struts that extend continuously across the rows of pods.
Figure 34:
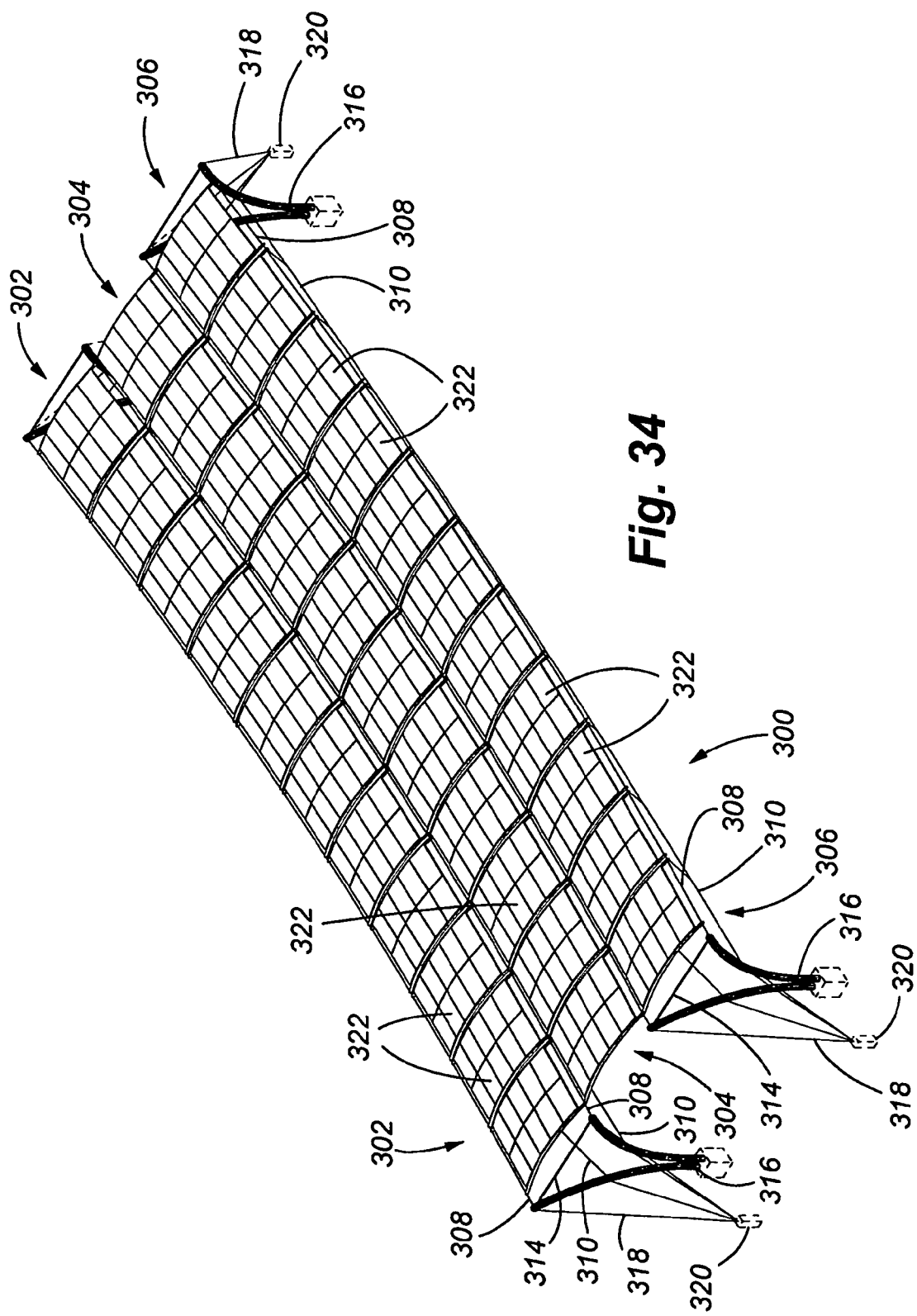
FIG. 34 is a perspective view of another embodiment of the present invention showing three rows of panel receivers/pods with convex curvatures when viewed from above.

Now referring to FIG. 33, a different arrangement of struts is illustrated wherein curved struts 330 are continuous across the entire width or transverse section of the array. In this embodiment, the array is more rigid since there is no gap or separation 309 between row 304 and the exterior rows 302 and 306. The array still maintains the same wave-like shape, but has greater rigidity in the transverse or lateral direction. Thus, this strut arrangement can increase the structure's resistance to horizontal loading from wind or seismic events especially when cables 308 are sized to handle such anticipated loads. Referring now to FIG. 34, another embodiment of a solar array 300 is illustrated wherein the intermediate or interior row 304 has a convex configuration as opposed to the concave configuration illustrated in FIG. 27. Therefore, the curved struts 330 for row 304 are oriented in the same manner as the curved struts used in rows 302 and 306 so that the opposite ends of the struts curve downward. This particular arrangement of the pods may also provide benefits with respect to managing wind or snow loading conditions, maximizing direct sunlight exposure, as well as to provide a different aesthetic appearance. Additionally, more complete water drainage is achieved by providing the convex shaped upper surface and therefore this pod arrangement is especially suited for those climates that may experience heavy rainfall.

Figure 35:
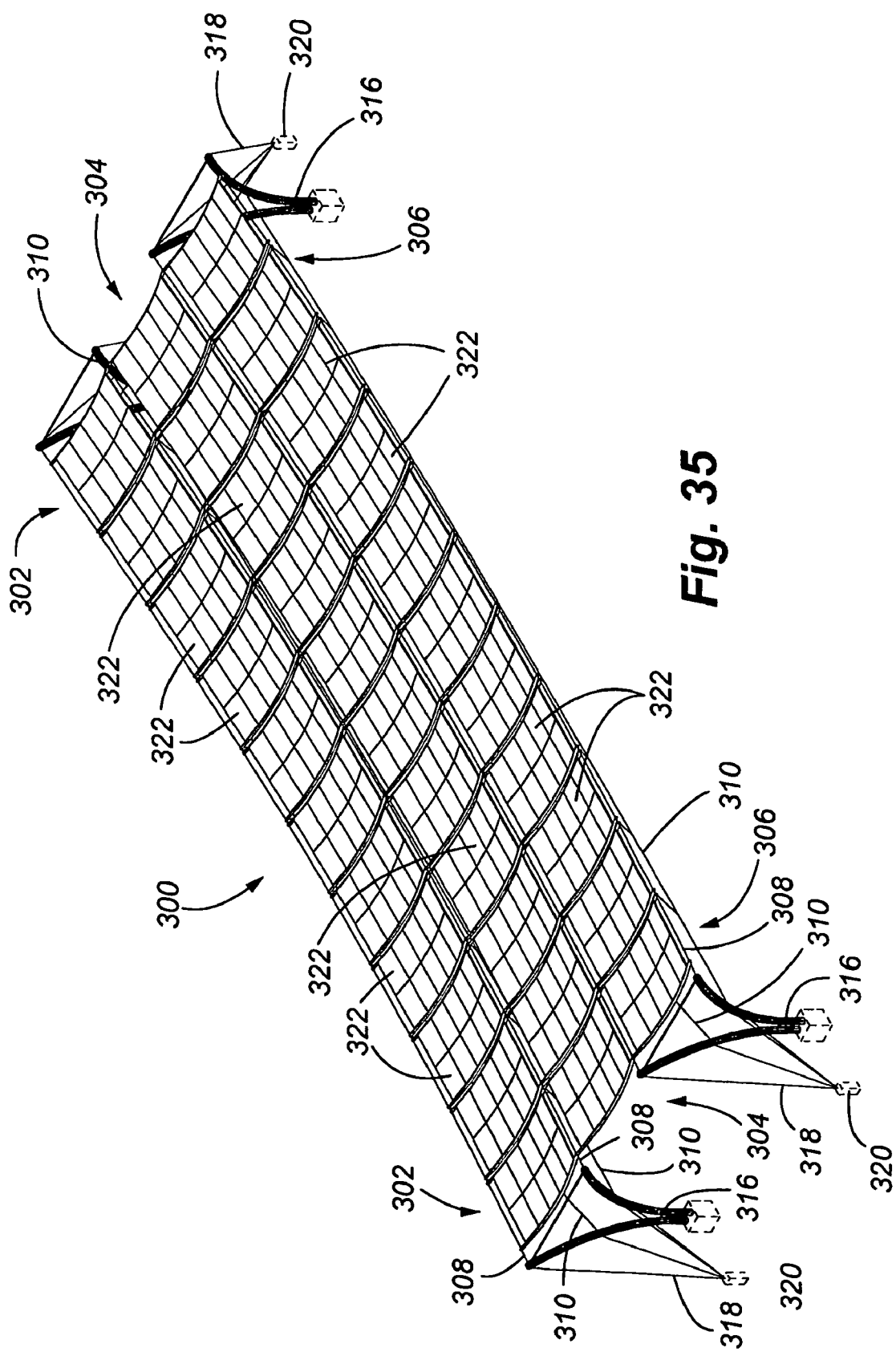
FIG. 35 is a perspective view of another embodiment of the present invention showing three rows of panel receivers/pods with concave curvatures when viewed from above.

Referring to FIG. 35, yet another configuration of an array 300 is provided wherein each of the rows 302, 304 and 306 have a concave configuration, like the configuration of row 304 in FIG. 27. Thus, the struts 330 are each oriented so that the opposite ends curve upward. This embodiment too may offer some benefits with respect to loading, maximizing sunlight capture, and a different aesthetic appearance.

Figure 36:
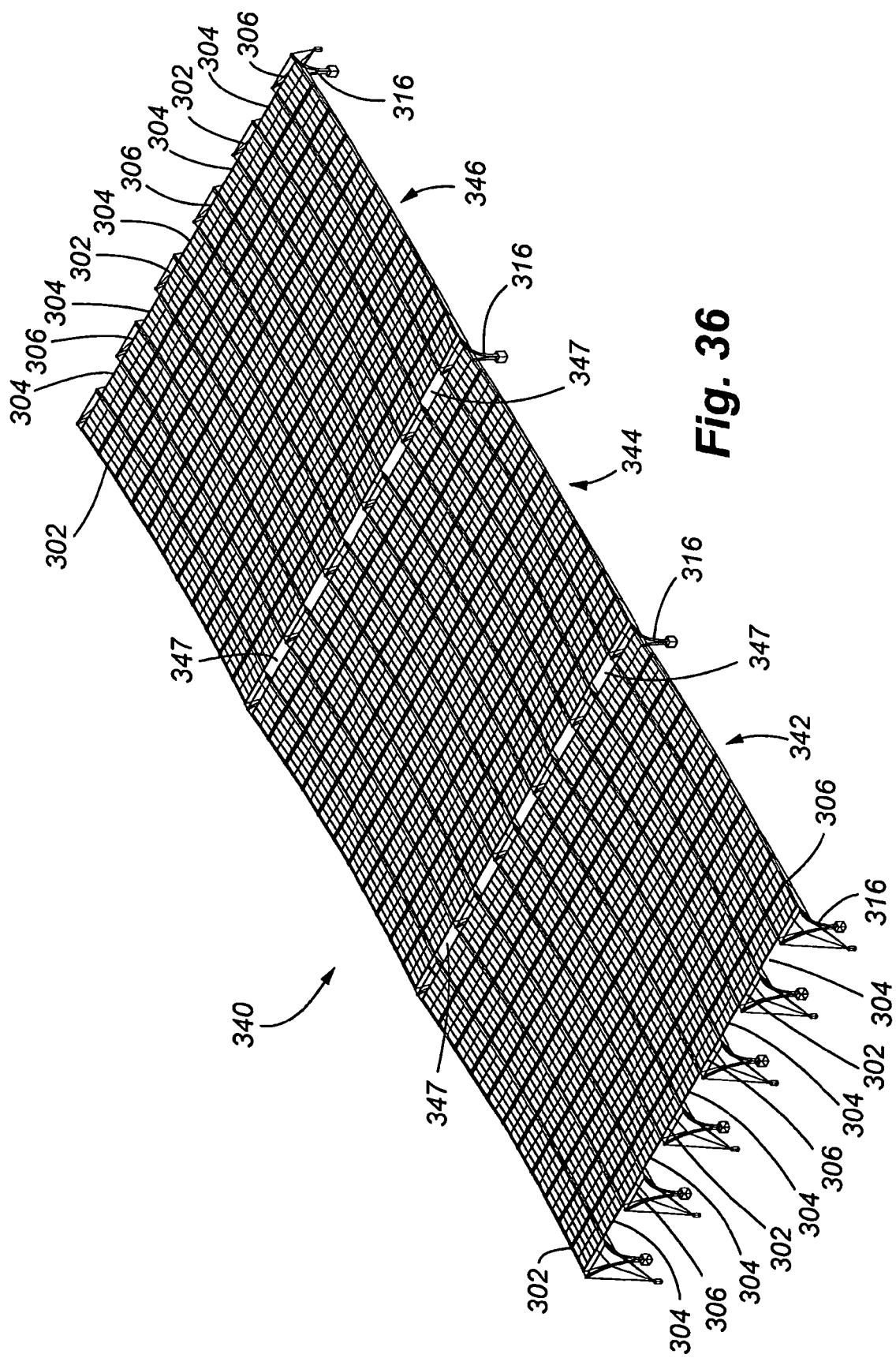
FIG. 36 is a perspective view of another embodiment of the present invention showing a plurality of three row configurations joined to form an array with three primary spans.

Referring to FIG. 36, another embodiment of the present invention is shown in a larger solar array system 340 comprising three primary spans 342, 344, and 346. The spans are defined as running transversely in relation to the rows of pods. This embodiment includes a plurality of sets of the three-row configuration of FIG. 27 as well as interconnecting rows 304 between the sets. Accordingly, FIG. 36 shows the rows of pods 302, 304, and 306 connected to one another in series. FIG. 36 also illustrates gaps 347 between the spans 342, 344, and 346 that accommodate mounting of intermediate columns 316. The embodiment of FIG. 36 is ideal for those installations when it is desired to maximize coverage of solar panels in a defined space, for example, to maximize electricity production and/or to provide a shaded area under the solar panels.

Figure 37:
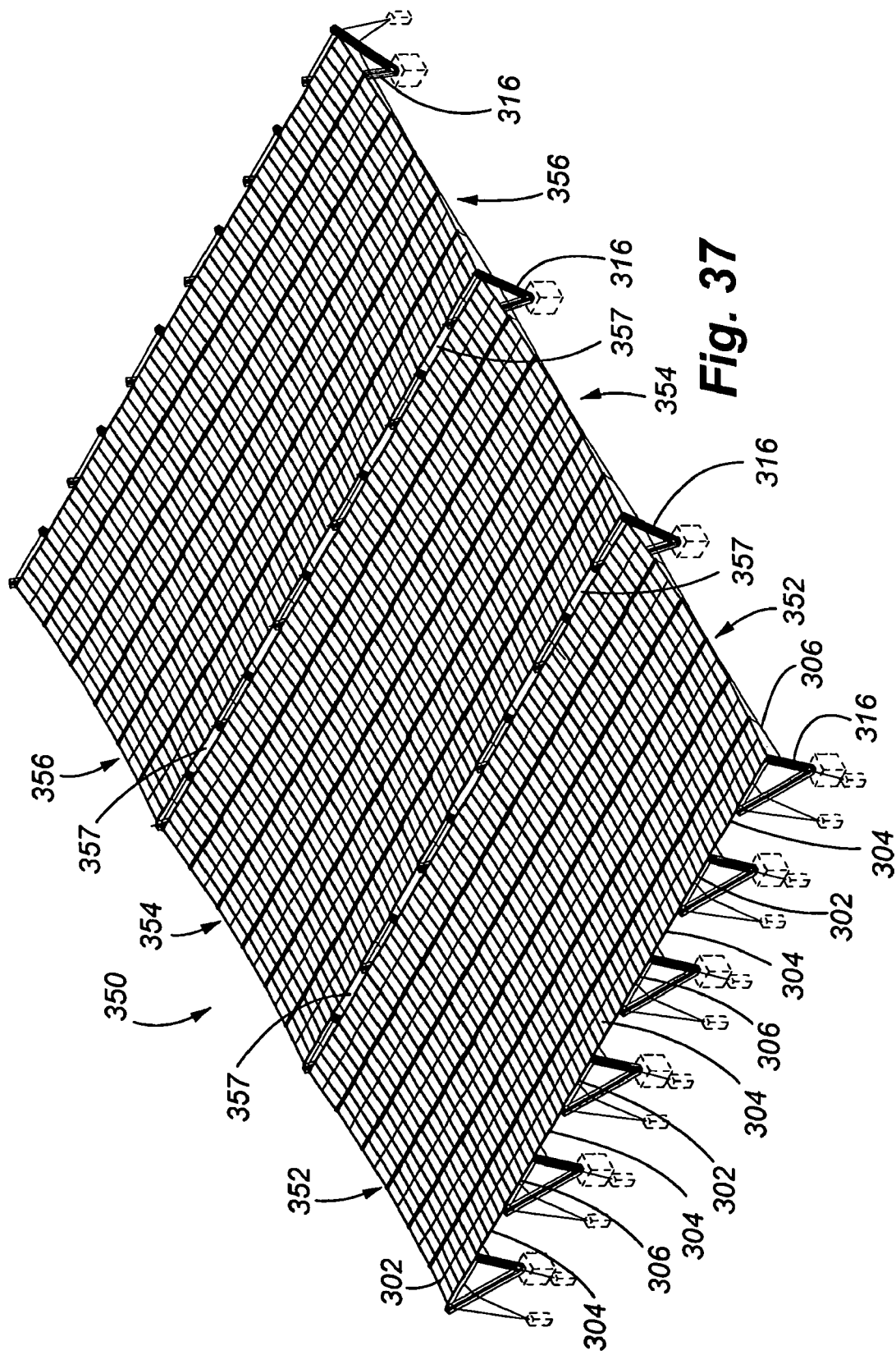
FIG. 37 is a perspective view of yet another embodiment of the present invention showing a plurality of three row configurations joined to form an array with three primary spans.

FIG. 37 illustrates yet another embodiment of the present invention showing an array 350 comprising three transversely oriented spans 352, 354, and 356. This embodiment also incorporates the sets of three row configurations of pods 302, 304, and 306 arranged in series to one another and including an interconnecting row 304 between each three-row grouping. The columns 316 are shown as v-shaped members and without curvature as compared to the columns 316 of FIG. 36. Gaps 357 are provided to allow mounting of the intermediate columns 316. FIG. 37 also represents that the pods incorporate continuous struts in the lateral or transverse direction thus eliminating gaps 309 if viewing FIG. 32A, but maintaining gaps 313.

Figure 38:
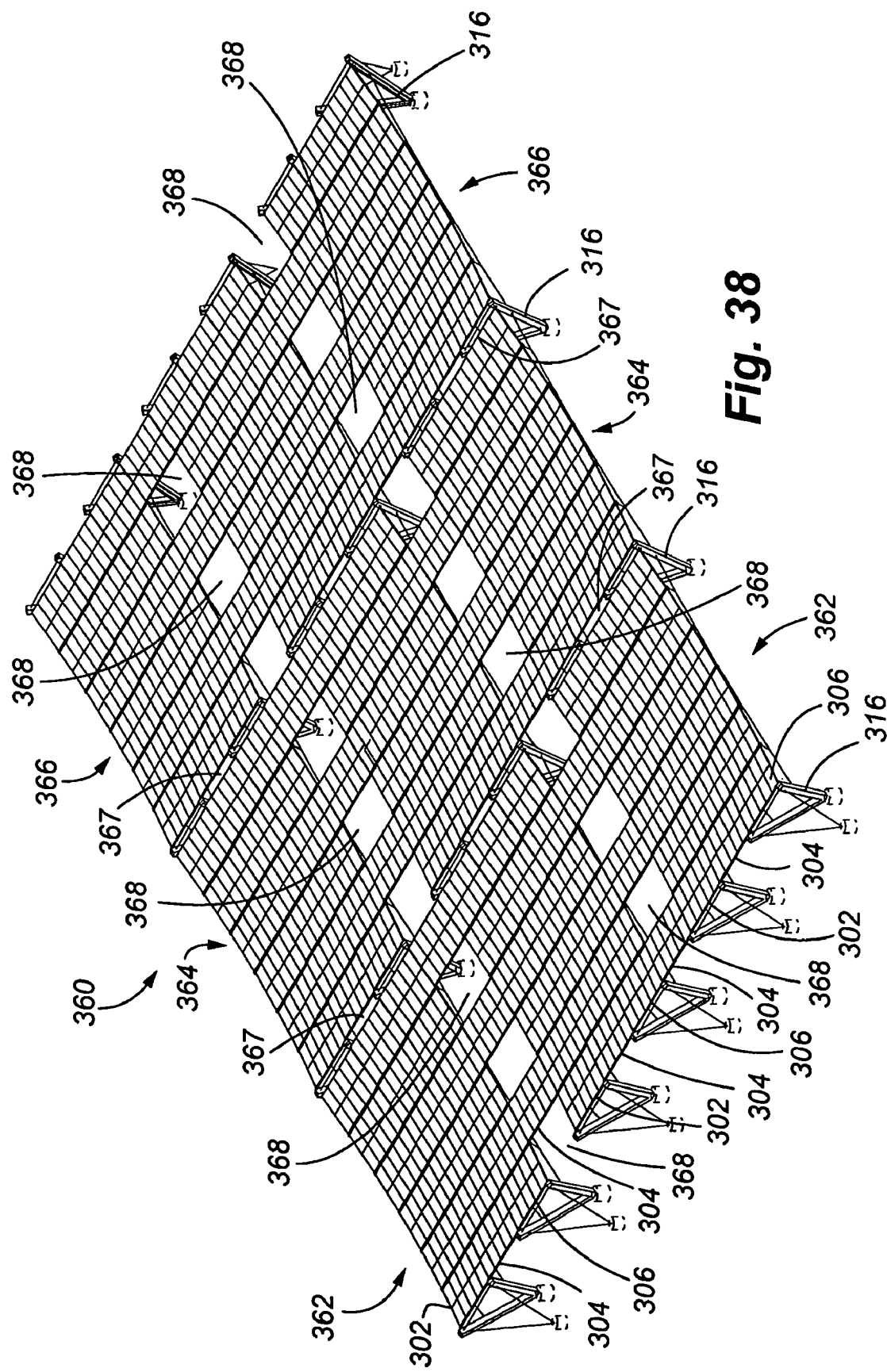
FIG. 38 is a perspective view of yet another embodiment of the present invention showing a plurality of three row configurations joined to form an array with three primary spans and a plurality of openings formed in the array by removing selected panel receivers/pods.

FIG. 38 illustrates yet another embodiment of the present invention illustrating an array 360 similar to the array 350 of FIG. 37, but the array of FIG. 38 further incorporates a plurality of gaps open spaces 368 that are formed by removing selected pods from a selected row/span. Gaps 367 enable mounting of the intermediate columns 316. Three spans 362, 364 and 366 are shown in this embodiment. The removal of the pods in this manner may be useful for achieving one of many purposes, such as to modify wind/snow-loading conditions, to provide additional sunlight under the array, or to provide a desired visual impression. The increased amount of sunlight under the array will also facilitate better plant growth that may be desirable in some installations where landscaping under the array incorporates selected vegetation.

Referring to FIG. 39, yet another preferred embodiment of the present invention is illustrated showing three spaced arrays 370, and each array 370 having three primary spans 372, 374, and 376, as well as the three row configuration of rows 302, 304, and 306. In the embodiment of FIG. 39, instead of providing an interconnecting row 304 of pods, there is complete separation among the arrays 370. Gaps 377 provide mounting space for the intermediate columns 316. This embodiment may be used in an installation where it may be necessary to provide gaps between the arrays due to the presence of interfering structures or natural obstacles, such as trees, lighting poles, etc. Safety requirements may also be accommodated by the gaps so that emergency vehicles with large heights are able to more easily access the areas between and under the arrays. Alternatively, it may be desirable for the installation to have a greater amount of sunlight between pod groups that is achieved by the spaced arrays.

FIG. 40 illustrates yet another embodiment of the present invention shown as array 380 comprising three primary spans 382, 384, and 386. This embodiment also incorporates the three-row configuration of rows 302, 304, and 306 and the interconnecting rows 304 between each three-row grouping. Gap 387 provides mounting space for the intermediate columns 388. In this embodiment, the columns are pairs of spaced vertical members 388, with an interconnecting and horizontally oriented cross support 389.

FIG. 41 illustrates yet another preferred embodiment of the present invention, showing an array 390 comprising three primary spans 392, 394, and 396, as well as the repeating arrangement of the three row configuration of rows 302, 304, and 306 and the interconnecting rows 304 between each three row grouping. Cross-support cables or bars 399 are provided between the upper ends of the columns. In this embodiment, the most outward or end group of columns 400 extends at an angle from the ground, while the interior columns 398 extend substantially perpendicular from the ground. Gaps 397 provide mounting space for the intermediate column 398.

The embodiments of FIGS. 27-41, are particularly suited as ground mount solar arrays, meaning that the height of the columns extends a shorter distance above the ground, such as eight to fifteen feet. The primary purpose of the ground mount solar arrays is to produce electricity. These ground mounts can be located in an area that may not be suitable for other construction purposes, or may be used to fill in unusable space within a commercial or industrial area to produce power. Because of the lower height at which the solar panels are mounted, there is less of a safety concern as compared to overhead mounted solar panels. Accordingly in the design of the ground mount, fewer supporting materials are required resulting in significant cost savings. For example, row 304 is suspended between rows 302 and 306 thus eliminating the need for additional column supports for that particular row of pods.

For the embodiments of FIGS. 27-41 as mentioned, the cable arrangement is similar to what is disclosed with respect to the embodiment of FIG. 14. Cables 308 extend substantially parallel to one another and have substantially the same curvature. Cables 310 are disposed below cables 308 and also extend substantially parallel to one another. Cables 310 have generally opposite curvatures as compared to cables 308. Cables 312 extend substantially perpendicular between cables 308 and 310. The gaps 309 between adjacent rows of pods, as well as the gaps 313 between adjacent pods in a row can be modified to best match the particular purpose of installation, as well as to provide the necessary support and passage of wind through the gaps in order to best handle wind and snow loading conditions.

It shall be understood that with respect to each of the preferred embodiments of the present invention, the pods may incorporate either curved struts 46/330 or straight struts 48/270. The number of transverse struts 48/272/332 can be selected to provide the necessary strength and support, and the spacing of each of the struts can also be selected to minimize required materials but satisfy the rigidity and strength requirements for the particular installation of the solar array.

Additionally, it shall be appreciated that the number of solar panels mounted to each pod can be configured for the particular installation. Thus, the pods may contain more or fewer solar panels as compared to what is illustrated in the preferred embodiments.

The flexible electric cables 82a and 82b may be incorporated in each of the embodiments of the present invention in order to allow each of the solar panel arrays to be coupled to a substation for gathering of produced power. As also mentioned, the solar panel arrays may be electrically coupled to sources of stored electric power such as batteries or fuel cells. Other arrangements of electrical cables may be used to most effectively transfer power from the solar panels to the power storage location or to a substation.

It will also be appreciated that due to the unique manner in which the solar panels may be supported by the modular nature of the pods, there is almost a limitless combination in the shape and size of an array that can be constructed for installation. The cables and columns can be arranged to provide the necessary support for not only very different sized and shaped arrays, but also arrays being either ground mounted or overhead mounted.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A solar panel array system comprising:
a plurality of panel receivers each having a plurality of solar panels mounted thereto, each panel receiver comprising a plurality of struts said plurality of panel receivers being arranged in three rows extending substantially parallel to one another and connected to one another along respective lateral edges, each row having a plurality of the panel receivers;
four columns supporting said panel receivers and positioned at corners of the plurality of panel receivers, wherein a first pair of columns directly support a first row of the panel receivers, and a second pair of columns directly support a second row of the panel receivers, and further wherein a third row of panel receivers is suspended between the first and second rows of panel receivers;
an adjacent pair of first upper cables suspended continuously between and connected to the first pair of columns; and
an adjacent pair of second upper cables spaced and separated from the first pair of upper cables, and suspended continuously between and connected to the second pair of columns, said third row of panel receivers having lateral sides with corresponding ones of said plurality of struts connected to one cable of both of said first and second pairs of upper cables.

2. A system, as claimed in claim 1, wherein:
said first and second rows of panel receivers each include a plurality of curved struts each having opposite ends arranged substantially equal distances from the surface upon which the system is mounted, and said curved struts having a middle area disposed above the opposite ends, wherein said first and second rows of panel receivers provide a convex shape when viewed from above;
said third row of panel receivers include a plurality of curved struts, said curved struts of said third row having opposite ends arranged substantially equal distances from the surface upon which the system is mounted, and said curved struts having a middle area disposed below the opposite ends, wherein said third row of panel receivers provide a concave shape when viewed from above.

3. A system, as claimed in claim 1, wherein:
said pair of first cables extend substantially parallel to one another and have substantially the same curvature.

4. A system, as claimed in claim 1, wherein:
said pair of second cables extend substantially parallel to one another, and have substantially the same curvature.

5. A system, as claimed in claim 1, further including:
a pair of third cables suspended between the first pair of columns and positioned below the pair of first upper cables; and
a pair of fourth cables suspended between the second pair of columns and positioned below said pair of second upper cables.

6. A system, as claimed in claim 5, wherein:
said pairs of first and second cables have a first curvature, and said pairs of third and fourth cables have a substantially opposite second curvature.

7. A system, as claimed in claim 6, wherein:
said system further includes a plurality of interconnecting cables spanning between said pairs of first and third cables and said pairs of second and fourth cables.

8. A system, as claimed in claim 1, wherein:
at least one of said columns extends at a non-vertical angle from the surface upon which the columns are mounted.

9. A system, as claimed in claim 1, wherein:
said panel receivers include a combination of curved struts and straight struts.

10. A system, as claimed in claim 1, further including:
a plurality of anchor lines connected to said columns, and a plurality of anchors connected to said anchor lines for anchoring said anchor lines into the surface upon which the system is mounted.

11. A system, as claimed in claim 1, further including:
a pair of cross-supports, one cross-support interconnecting a pair of column elements.

12. A system, as claimed in claim 1, wherein:
said columns are v-shaped.

13. A system, as claimed in claim 1, wherein:
at least one row of panel receivers each include a plurality of curved struts, each strut having opposite ends arranged substantially equal distances from the surface upon which the system is mounted, and each strut having a middle area either disposed above the opposite ends to provide a convex appearance when viewed from above, or having a middle area disposed below the opposite ends to provide a concave appearance when viewed from above.

14. A system, as claimed in claim 1, wherein:
said rows of panel receivers include a combination of curved struts and straight struts, and wherein the curved struts are used to provide a selected convex or concave appearances when viewed from above, and said straight struts provide a flat appearance when viewed from above.

15. A system, as claimed in claim 1, wherein:
selected panel receivers in at least one row are removed from said system thereby providing gaps to facilitate the passing of light through the gaps.

16. A system, as claimed in claim 1, wherein:
each of said panel receivers include a plurality of struts, and each of said struts has a length corresponding to a width of a row of panel receivers, and wherein said struts are separated between each row by a gap.

17. A system, as claimed in claim 1, wherein:
each of said panel receivers include a plurality of struts, and each of said struts extends continuously between said three rows, and wherein said struts define a width of the array comprising said three rows of panel receivers.

18. A system, as claimed in claim 16, wherein at least one of said struts is curved.

19. A system, as claimed in claim 17, wherein at least one of said struts is curved.

20. A solar panel array system comprising:
a plurality of panel receivers each having a plurality of solar panels mounted thereto, each panel receiver comprising a plurality of struts said plurality of panel receivers being arranged in three rows extending substantially parallel to one another and connected to one another along respective lateral edges, each row having a plurality of the panel receivers;
four columns supporting said panel receivers and positioned at corners of the plurality of panel receivers, wherein a first pair of columns directly support a first row of the panel receivers, and a second pair of columns directly support a second row of the panel receivers, and further wherein a third row of panel receivers is suspended between the first and second rows of panel receivers;
an adjacent pair of first upper cables suspended continuously between and connected to the first pair of columns;
an adjacent pair of second upper cables spaced and separated from the first pair of upper cables, and suspended continuously between and connected to the second pair of columns, said third row of panel receivers having lateral sides with corresponding ones of said plurality of struts connected to one cable of both of said first and second pairs of upper cables; and
a pair of third cables suspended between the first pair of columns and positioned below the pair of first upper cables.

* * * * *